(12) United States Patent
McNeal et al.

(10) Patent No.: US 11,363,752 B2
(45) Date of Patent: Jun. 21, 2022

(54) FARMING TOOL

(71) Applicants: Carson McNeal, Doyle, TN (US); Conor Crickmore, Claryville, NY (US)

(72) Inventors: Carson McNeal, Doyle, TN (US); Conor Crickmore, Claryville, NY (US)

( * ) Notice: Subject to any disclaimer, the term of this patent is extended or adjusted under 35 U.S.C. 154(b) by 0 days.

(21) Appl. No.: 17/215,084

(22) Filed: Mar. 29, 2021

(65) Prior Publication Data
US 2021/0212246 A1    Jul. 15, 2021

Related U.S. Application Data

(63) Continuation of application No. 16/351,827, filed on Mar. 13, 2019.

(60) Provisional application No. 62/642,434, filed on Mar. 13, 2018.

(51) Int. Cl.
*A01B 1/22* (2006.01)
*A01B 1/10* (2006.01)

(52) U.S. Cl.
CPC ............... *A01B 1/227* (2013.01); *A01B 1/10* (2013.01)

(58) Field of Classification Search
CPC .................................. A01B 1/227; A01B 1/10
USPC .................................................. 172/371, 376
See application file for complete search history.

(56) References Cited

U.S. PATENT DOCUMENTS

| | | | | |
|---|---|---|---|---|
| 417,169 A | * | 12/1889 | Graham | A01B 1/06 172/354 |
| 1,262,482 A | * | 4/1918 | Hales | A01B 1/06 172/372 |
| 1,339,436 A | * | 5/1920 | Conrad | A01D 7/10 56/400.07 |
| 2,083,750 A | * | 6/1937 | Tennigkeit | A01B 1/06 172/720 |
| 2,119,165 A | * | 5/1938 | Hornstein | A01D 7/02 56/400.2 |
| 2,397,786 A | * | 4/1946 | Gascoigne et al. | A01B 1/06 172/376 |
| 2,790,368 A | * | 4/1957 | Horton | A01B 1/16 172/376 |
| 2,976,938 A | * | 3/1961 | Rapp | A01B 1/225 172/376 |
| 4,162,132 A | * | 7/1979 | Kress et al. | B25G 3/26 403/361 |

(Continued)

FOREIGN PATENT DOCUMENTS

GB            2161682 A  *  1/1986  ............... A01B 1/16

OTHER PUBLICATIONS

Photograph of prior art wire hoe with bolt and solder design.

*Primary Examiner* — Thomas B Will
*Assistant Examiner* — Joel F. Mitchell
(74) *Attorney, Agent, or Firm* — Shane Cortesi

(57) ABSTRACT

Farming tool systems may include a handle shaft and a farming tool that detachably connects to the handle shaft via a locking bit and a locking port that includes a socket. In some embodiments, a multi-head attachment may include one or more farming tools that slide laterally along a rail (perpendicular to the shaft length) and another farming tool that does not slide along the rail. In some embodiments, the farming tool(s) is a hoe. The farming tool(s) may be in the form of a wire that includes flat portions located inside a crimp to prevent the wire from rotating within the crimp and a forward portion that may be, for example, generally triangular in shape.

6 Claims, 19 Drawing Sheets

(56) References Cited

U.S. PATENT DOCUMENTS 4,854,391 A * 8/1989 Johnson .................. A01B 1/06
172/354
6,131,381 A * 10/2000 Milbury .................. A01B 1/24
172/371

* cited by examiner

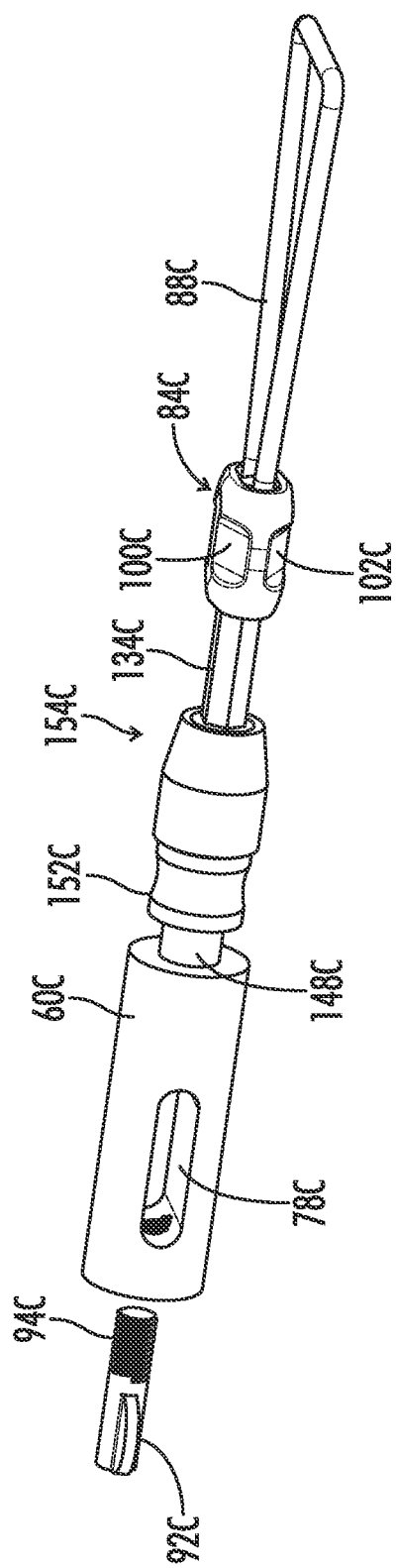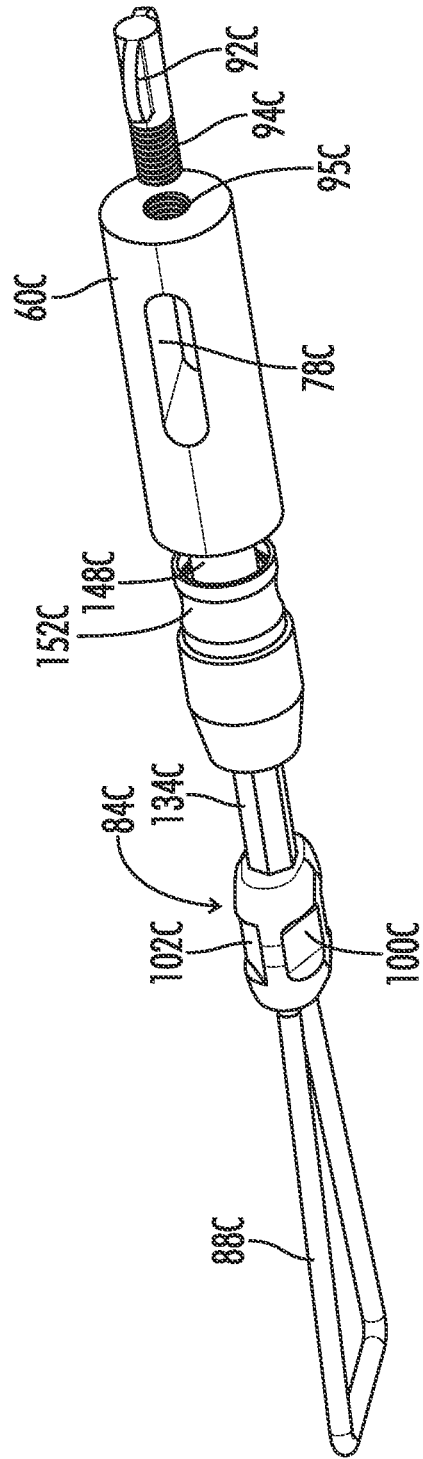

FARMING TOOL

RELATED APPLICATIONS

The present application is a continuation of U.S. patent application Ser. No. 16/351,827, filed Mar. 13, 2019, the contents of which are incorporated herein by reference in their entirety, which claimed priority to U.S. Patent Application No. 62/642,434, filed Mar. 13, 2018, the contents of which are incorporated herein by reference in their entirety.

BACKGROUND

Technical Field

The present invention relates to farming tools, particularly farming tools with interchangeable heads.

Background of the Invention

Farming tools have been used for centuries. However, there has been a continuing need for multi-purpose farming tools to eliminate the need of carrying numerous individual tools into the field.

Long handled cultivation tools and human powered (and now motor driven) wheel hoes are standard in agriculture and horticulture to control weeds that adversely affect growing conditions of the surrounding crops. As long as there have been these tools there too have been various methods of changing the function by detaching and reattaching the working section of the tool to allow for different uses.

There is a large body of published patent literature concerned with many aspects of this technology. U.S. Pat. No. 1,273,464 is an early example of interchangeable garden tools, along with the prior art included in this application.

Improvement has been needed in the type of heads available. Using thin wire attached to thicker shafts allows the creation of limitless shapes and uses. Using thin wire does not come without problems.

BRIEF SUMMARY

The present disclosure provides farming tools as described herein.

In some embodiments, the present disclosure provides a multi-headed farming tool system that may include a handle shaft that may be configured to be grasped by a human user and may have a shaft rear end, a shaft forward end, a shaft length extending from the rear end to the forward end, and a shaft width generally perpendicular to the shaft length. The system may further include a handle locking port that may be connected to the handle shaft and may include a handle locking port open forward end leading to a handle locking port socket, a handle locking port rear end, a handle locking port length extending from the handle locking port open forward end to the handle locking port rear end, and a handle locking port protrusion located between the handle locking port open forward end and the handle locking port rear end and configured to project into the handle locking port socket. The system may further include a multi-head attachment that may include a multi-head attachment rear end, a multi-head attachment forward end, a multi-head attachment length extending from the multi-head attachment rear end to the multi-head attachment forward end that may be generally parallel to the locking port length, a multi-head attachment left end, a multi-head attachment right end, and a multi-head attachment width extending from the multi-head attachment left end to the multi-head attachment right end and generally perpendicular to the multi-head attachment length. The multi-head attachment may further include a multi-head locking bit that may include a multi-head locking bit rear end located adjacent to the multi-head attachment rear end, a multi-head locking bit forward end, a multi-head locking bit length extending from the multi-head locking bit rear end to the multi-head locking bit forward end that may be generally parallel to the handle locking port length, a multi-head locking bit width generally perpendicular to the multi-head locking bit length, a multi-head locking bit rear notch located between the multi-head locking bit forward end and the multi-head locking bit rear end. The multi-head locking bit rear notch may be configured to removably seat inside the handle locking port socket. The handle locking port protrusion may be configured to releasably engage the multi-head locking bit rear notch. The multi-head attachment may further include a main head that may include a main base that may include a main base rear end that may be connected to the multi-head locking bit forward end, a main base forward end, a main base length extending from the main base rear end to the main base forward end that may be generally parallel to the multi-head attachment length, and a main base width generally perpendicular to the main base length. The multi-head attachment may further include a rail that may be connected to the main base and comprising a rail left end, a rail right end, and a rail width extending from the rail left end to the rail right end that may be generally parallel to the main base width and multi-head attachment width. The multi-head attachment may further include at least one lateral head located to the left or right of the main head. The at least one lateral head may include a lateral base comprising a rear end, a forward end, a length extending from the forward end to the rear end and generally parallel to the main base length, a width generally perpendicular to the length and generally parallel to the multi-head attachment width, a slot extending through the width and receiving a portion of the rail, and a lock. The lock may have a locked position in which the lateral base is not slideable along at least a portion of the rail width and an unlocked position in which the lateral base is not slideable along at least a portion of the rail width. Optionally, the handle locking port has an unlocked position in which the multi-head locking bit is removable forwardly out of the handle locking port socket and a locked position in which the handle locking port protrusion moves laterally towards the multi-head locking bit rear notch and prevents the multi-head locking bit from being moved out of the handle locking port socket.

Optionally, the shaft length is at least about 24 inches and the shaft width is no greater than about 2 inches. Optionally, the main base is fixed to the rail and not moveable along the rail width. Optionally, at least one of the at least one lateral head and the main head is detachably connected to a farming tool that may include a rear section comprising a rod detachably connected to the at least one lateral head or the main head and a forward section located forwardly relative to the rear section and comprising a metallic projection configured to move dirt or vegetation. Optionally, at least one of the at least one lateral head and the main head comprises a head locking port that may be located forwardly relative to the base of the respective head and may include a head locking port socket receiving the rod of the farming tool. Optionally, the farming tool further comprises a tool collar connecting the rod to the projection, the projection is in the form of a wire, the tool collar comprises a tool collar interior comprising at least one segment of the rod and at least one segment of the wire, and at least one segment of the rod extends rearwardly from the tool collar and at least one segment of the wire extends forwardly from the tool collar. Optionally, the tool collar is in the form of a crimp, the at least one segment of the wire located in the tool collar interior comprises a flat front, a flat rear, a thickness extending from the flat front to the flat rear and generally perpendicular to the multi-head attachment width, the tool collar comprises an indented front portion engaging the flat front and an indented rear portion engaging the flat rear. Optionally, the indented front portion and the indented rear portion are configured to prevent the wire from rotating within the tool collar interior. Optionally, the at least one segment of the rod located in the tool collar interior comprises a forward notch extending about a perimeter of the rod and the tool collar engages the forward notch and prevents the rod rotating in the tool collar interior. Optionally, the wire comprises a free proximal end and a free distal end and further wherein the at least one segment is adjacent to at least one of the free proximal end and the free distal end. Optionally, at least one of the main head and the at least one lateral head further comprises at least one head locking port that may include a head locking port open forward end leading to a head locking port socket, a head locking port rear end connected to, and located forwardly relative to, the main base or the at least one lateral base, a head locking port length extending from the head locking port open forward end to the head locking port rear end and generally parallel to multi-head attachment length, and a head locking port protrusion that may be located between the head locking port open forward end and the head locking port rear end and may be configured to project into the head locking port socket. Optionally, the rod of the farming tool is in the form of a tool locking bit comprising a tool locking bit rear end, a tool locking bit forward end, a tool locking bit length extending from the tool locking bit rear end to the tool locking bit forward end, a tool locking bit width generally perpendicular to the tool locking bit length, a tool locking bit rear notch located between the tool locking bit forward end and the tool locking bit rear end. Optionally, the tool locking bit rear notch is configured to removably seat inside the head locking port socket. Optionally, the head locking port protrusion is configured to releasably engage the tool locking bit rear notch. Optionally, the head locking port has an unlocked position in which the tool locking bit is removable forwardly out of the head locking port socket and a locked position in which the head locking port protrusion moves laterally towards the tool locking bit rear notch and prevents the tool locking bit from being moved out of the head locking port socket. Optionally, the rear ends of the multi-head locking bit and the tool locking bit are the same width and same shape. Optionally, the rear end of the multi-head locking bit, the rear end of the tool locking bit, the head locking port socket and the handle locking port socket are hexagonal in shape. Optionally, the multi-head locking bit rear notch extends about a perimeter of the multi-head locking bit and the tool locking bit rear notch extends about a perimeter of the tool locking bit. Optionally, the handle locking port open forward end is generally hexagonal in shape. Optionally, the rail is in the form of a generally rectangular ruler comprising indicia (e.g., numbers and/or hatch marks) spaced at regular intervals (e.g., whole inches or centimeters or fractions of inches or fractions of centimeters). Optionally, the lock of the at least one lateral base is in the form of a clamp configured to releasably engage the rail. Optionally, the clamp comprises a rotatable knob, and a bolt located forwardly relative to, and connected to the knob, and the clamp is located adjacent to the rear end of the at least one lateral base. Optionally, the multi-head locking bit and the main base are located approximately in the center of the multi-head attachment width. Optionally, the handle locking port comprises a handle rod having a handle rod length generally parallel to the shaft length, a handle rod collar comprising an interior receiving the handle rod and a handle rod flange comprising an interior comprising the handle locking port socket, and moving the handle rod collar rearwardly along a portion of the handle rod length relative to the handle rod flange is configured to move the handle locking port from the locked position to the unlocked position. Optionally, the handle rod collar interior comprises a forward ledge extending from the handle rod, a rear ledge and a spring located between the forward ledge and the rear ledge and moving the handle rod collar rearwardly along a portion of the handle rod length relative to the handle rod flange is configured to compress the spring. Optionally, the spring is configured to resist rearwardly movement of the handle rod collar relative to the handle rod flange and to bias the handle locking port in the locked position. Optionally, the handle locking port protrusion is a ball. Optionally, the handle shaft is in the shape of a straight cylinder. Optionally, the handle shaft length is greater than the handle shaft width, wherein the handle locking port is located forwardly relative to the shaft forward end and further wherein the multi-head attachment length is generally parallel to the shaft length. Optionally, the system further includes a wheel connected to the handle shaft. Optionally, the system is used in a method of using the multi-headed farming tool system that includes the steps of a) providing the system, wherein at least one of the at least one lateral head and the main head is detachably connected to a farming tool comprising a rear section comprising a rod detachably connected to the at least one lateral head or the main head and a forward section located forwardly relative to the rear section and comprising a metallic projection configured to move dirt or vegetation; and b) using the farming tool to move dirt or vegetation. In still further embodiments, the system may be used in a method that includes a) providing the system; and b) moving the handle rod collar rearwardly and moving the multi-head locking bit forwardly from the handle locking port socket. In still further embodiments, the system may be used in a method that includes a) providing the system; and b) moving a head rod collar of the head locking port rearwardly and moving the tool locking bit forwardly from the head locking port socket.

In still further embodiments, the present disclosure provides a multi-head attachment that includes a multi-head attachment rear end, a multi-head attachment forward end, a multi-head attachment length extending from the multi-head attachment rear end to the multi-head attachment forward end, a multi-head attachment left end, a multi-head attachment right end, and a multi-head attachment width extending from the multi-head attachment left end to the multi-head attachment right end and generally perpendicular to the multi-head attachment length. The multi-head attachment may further include a multi-head locking bit that may include a multi-head locking bit rear end located that may be adjacent to the multi-head attachment rear end, a multi-head locking bit forward end, a multi-head locking bit length extending from the multi-head locking bit rear end to the multi-head locking bit forward end, a multi-head locking bit width generally perpendicular to the multi-head locking bit length, a multi-head locking bit rear notch that may be located between the multi-head locking bit forward end and the multi-head locking bit rear end. The multi-head locking bit rear notch configured to removably seat inside a handle locking port socket. The multi-head assembly may further include a main head comprising a main base comprising a main base rear end connected to the multi-head locking bit forward end, a main base forward end, a main base length extending from the main base rear end to the main base forward end that may be generally parallel to the multi-head attachment length, and a main base width generally perpendicular to the main base length. The multi-head assembly may further include a rail connected to the main base that includes a rail left end, a rail right end, and a rail width extending from the rail left end to the rail right end that may be generally parallel to the main base width. The multi-head assembly may further include at least one lateral head located to the left or right of the main head that may include a lateral base comprising a rear end, a forward end, a length extending from the forward end to the rear end and generally parallel to the main base length, a width that may be generally perpendicular to the length and the multi-head attachment length, a slot extending through the width and receiving a portion of the rail, and a lock. The lock may have a locked position in which the lateral base is not slideable along at least a portion of the rail width and an unlocked position in which the lateral base is not slideable along at least a portion of the rail width. The multi-head attachment may further include one or more features described above including without limitation a head locking port that may receive a rod (e.g., locking bit) of a farming tool, the main base may be fixed (not slideable), the lock may be in the form of a clamp as described previously, the rail may include indicia and may be in the form of a ruler as described previously, and the components may include particular shapes (e.g., a ball in the case of the protrusion(s) and hexagonal sockets and locking bits). In addition, the multi-head attachment may be detachably connected to a handle shaft as described previously.

In still further embodiments, the present disclosure provides a farming tool system that may include a handle shaft configured to be grasped by a human user and having a rear end, a forward end, a shaft length extending from the rear end to the forward end, and a shaft width generally perpendicular to the shaft length. Optionally, the shaft width is less than the shaft length. The system may further include a handle locking port that may be located forwardly relative to the handle shaft and comprising a handle locking port open forward end leading to a handle locking port socket, a handle locking port rear end, a handle locking port length extending from the handle locking port open forward end to the handle locking port rear end that may be generally parallel to the shaft length, and a handle locking port protrusion that may be located between the handle locking port open forward end and the handle locking port rear end that may be configured to project into the handle locking port socket. Optionally, the system further includes a farming tool that may include a farming tool rear end, a farming tool forward end, a farming tool length extending from the farming tool forward end to the farming tool rear end, a tool locking bit that may include a tool locking bit comprising a tool locking bit rear end adjacent to the farming tool rear end, a tool locking bit forward end, a tool collar in the form of a crimp and comprising a tool collar interior, and a wire extending forwardly from the tool collar interior to the farming tool forward end. Optionally, the wire comprises at least one segment located in the tool collar interior comprises a flat front, a flat rear, a thickness extending from the flat front to the flat rear and generally perpendicular to the shaft width. Optionally, the tool collar comprises an indented front portion engaging the flat front and an indented rear portion engaging the flat rear, the indented front portion and the indented rear portion configured to prevent the wire from rotating within the tool collar interior. Optionally, the system includes one or more features described in any of the embodiments above.

In still further embodiments, the present disclosure provides a farming tool system that may include a handle shaft configured to be grasped by a human user and having a rear end, a forward end, a shaft length extending from the rear end to the forward end, and a shaft width generally perpendicular to the shaft length. Optionally, the shaft width is less than the shaft length. The system may further include a handle locking port that may be located forwardly relative to the handle shaft and may include a handle locking port open forward end leading to a handle locking port socket, a handle locking port rear end, a handle locking port length extending from the handle locking port open forward end to the handle locking port rear end and generally parallel to the shaft length, and a handle locking port protrusion that may be located between the handle locking port forward end and the handle locking port rear end and that may be configured to project into the handle locking port socket. Optionally, the system further includes a farming tool that may include a farming tool rear end, a farming tool forward end, a farming tool length extending from the farming tool forward end to the farming tool rear end, a farming tool locking bit comprising a farming tool locking bit comprising a farming tool locking bit rear end adjacent to the farming tool rear end, a farming tool locking bit forward end, and a hoe comprising a curved rear shaft extending from the tool locking bit forward end and a blade connected to the curved rear shaft in the form of a generally rectangular plate oriented generally perpendicular to the shaft length. The plate may include a plate front end, a plate rear end, a plate thickness extending from the plate front end to the plate rear end, and a plate aperture extending from the plate front end to the plate rear end. Optionally, the system includes one or more features described in any of the embodiments above.

In still further embodiments, the present disclosure provides a farming tool system that may include a handle shaft that may be generally cylindrical and configured to be grasped by a human user and having a shaft rear end, a shaft forward end, a shaft length of at least about 24 inches extending from the rear end to the forward end, and a width/diameter of between about 0.5 inches and about 2 inches generally perpendicular to the shaft length. The farming tool system may further include a handle locking port that may be located forwardly relative to the handle shaft and may include a handle locking port open forward end leading to a handle locking port socket, a handle locking port rear end, a handle locking port length extending from the handle locking port open forward end to the handle locking port rear end connected to the handle shaft forward end, and a handle locking port protrusion that may be located between the handle locking port open forward end and the handle locking port rear end and that may be configured to project into the handle locking port socket. Optionally, the handle locking port socket is configured to receive a locking bit. Optionally, the handle locking port has an unlocked position in which a locking bit is removable forwardly out of the handle locking port socket and a locked position in which the handle locking port protrusion moves laterally into the handle locking port socket and prevents the locking bit from being moved out of the handle locking port socket. Optionally, the handle locking port comprises a handle rod having a handle rod length generally parallel to the shaft length, a handle rod collar comprising an interior receiving the handle rod and a handle rod flange comprising an interior comprising the handle locking port socket, and further wherein moving the handle rod collar rearwardly towards the handle shaft forward end along a portion of the handle rod length is configured to move the handle locking port from the locked position to the unlocked position. Optionally, the system includes one or more features described in any of the embodiments above.

BRIEF DESCRIPTION OF THE DRAWINGS

in FIG. 1, the farming tool system includes a multi-head attachment detachably connected to the handle locking port.

FIG. 6 illustrates a side perspective view of the right base (and attached right locking port and right farming tool) of FIG. 5.

FIG. 7 illustrates a side perspective view of the right base (and attached right locking port and right farming tool) of FIG. 5; as compared to FIG. 6, the right base (and attached right farming tool and right locking port) have been flipped over and inverted in FIG. 7.

in FIG. 9, the right locking port is in the locked position.

in FIG. 11, the right head rod collar has moved rearwardly (as indicated by the rearward-pointing directional arrow) so that the right head locking port is in the unlocked position, which has allowed the user to move the tool locking bit forwardly (as indicated by the forward-pointing directional arrow).

in FIG. 15A, the farming tool system includes a single farming tool detachably connected to the handle locking port.

DETAILED DESCRIPTION

Figure 1:
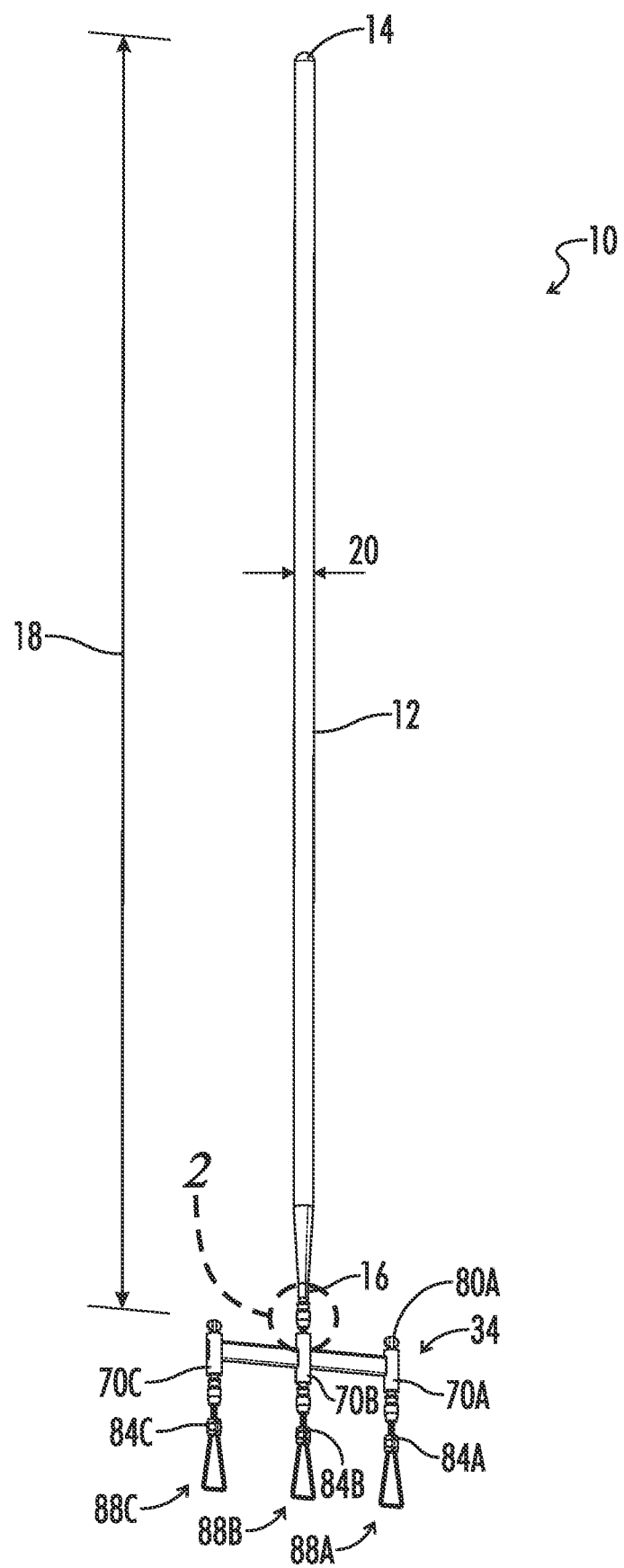
FIG. 1 illustrates a front perspective view of a farming tool system of one embodiment of the present invention.
Figure 2:
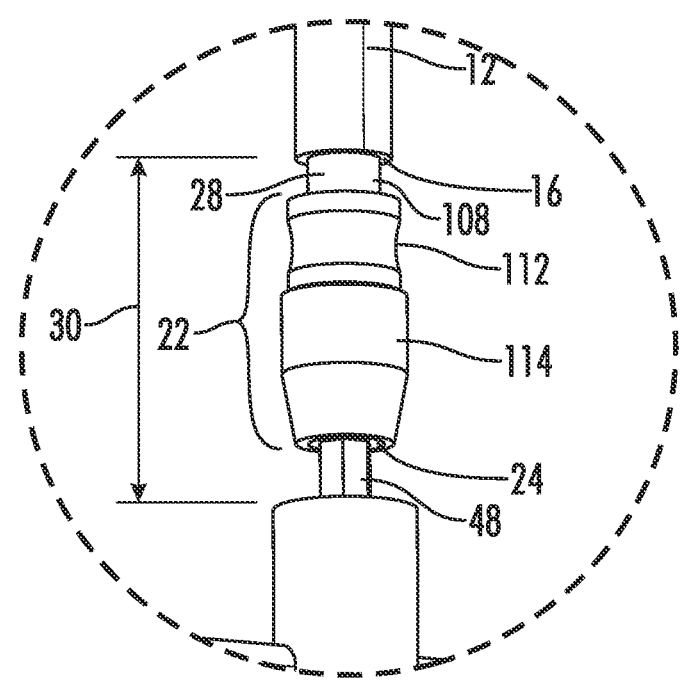
FIG. 2 illustrates a closeup view of the circled area labeled 2 in FIG. 1.

With reference to FIGS. 1-23, the present invention provides a farming tool system generally designated by the numeral 10. In the drawings, not all reference numbers are included in each drawing for the sake of clarity. It will be understood that the above drawings are CAD drawings drawn to scale.

Referring further to FIGS. 1-23, the farming tool system 10 may include a handle shaft 12 configured to be grasped by a human user that may have a shaft rear end 14, a shaft forward end 16, a shaft length 18 extending from the rear end 14 to the forward end 16, and a shaft width 20 generally perpendicular to the shaft length 18. In some embodiments, the handle shaft 12 is straight. In a preferred embodiment, the handle shaft 12 is cylindrical. In some embodiments, as described in later detail below, the farming tool system 10 includes two handle shafts 12A and 12C as shown in the wheel hoe of FIGS. 19-23.

The farming tool system 10 may further include a handle locking port 22 that may be located forwardly relative to the shaft forward end 16.

In the embodiments of FIGS. 1-14 and 19-23, a multi-head attachment 34 is detachably connected to the handle locking port 22 and the multi-head attachment 34 in turn may be connected to multiple farming tools 82A, 82B, and 82C. In the embodiments of FIGS. 15-18, a single farming tool 82 is detachably connected to the handle locking port 22. Preferably, the handle locking port 22 and handle shaft 12 do not change between the embodiments, which allow the handle locking port 22 to accommodate a variety of attachments, including the multi-head attachment 34 of FIGS. 1-14 and the single farming tools 82 of FIGS. 15-18. In addition, as shown in the illustrations, preferably the left, main and right head locking ports 122A, B, and C (which, as described below, are components of the multi-head attachment 34) use the same components as the handle locking port 22, which allows the farming tools 88 and 88A-C of FIGS. 1-23 to be detachably connected to either the handle locking port 22 or the left, main and right head locking ports 122A, B, and C to create a system 10 of interchangeable parts.

Figure 9:
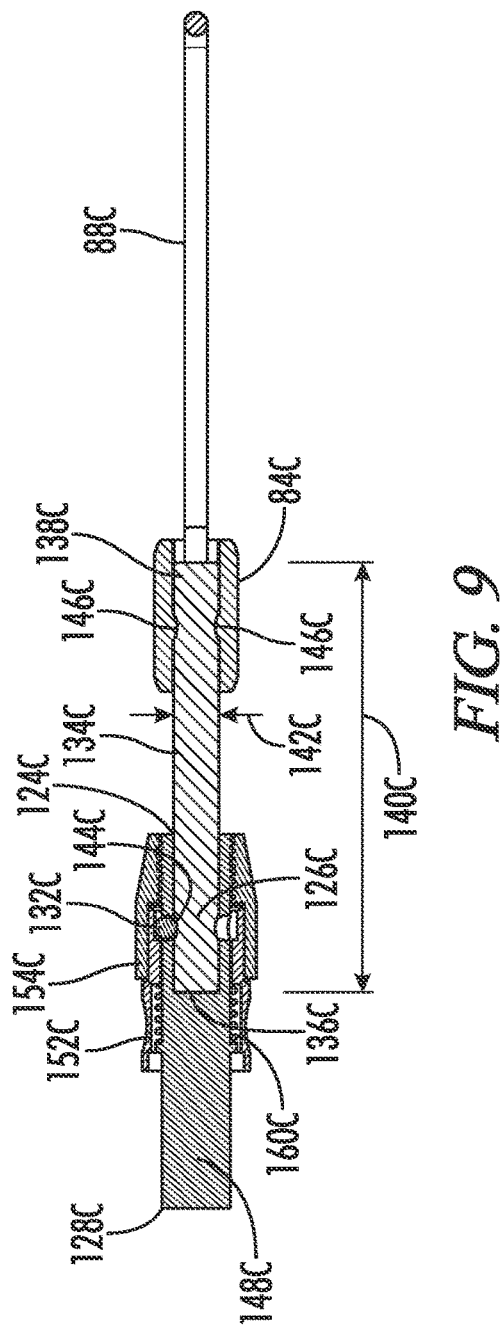
FIG. 9 illustrates a sectional view of the right locking port and right farming tool of FIG. 8, taken along line 9-9 of FIG. 8.
Figure 10:
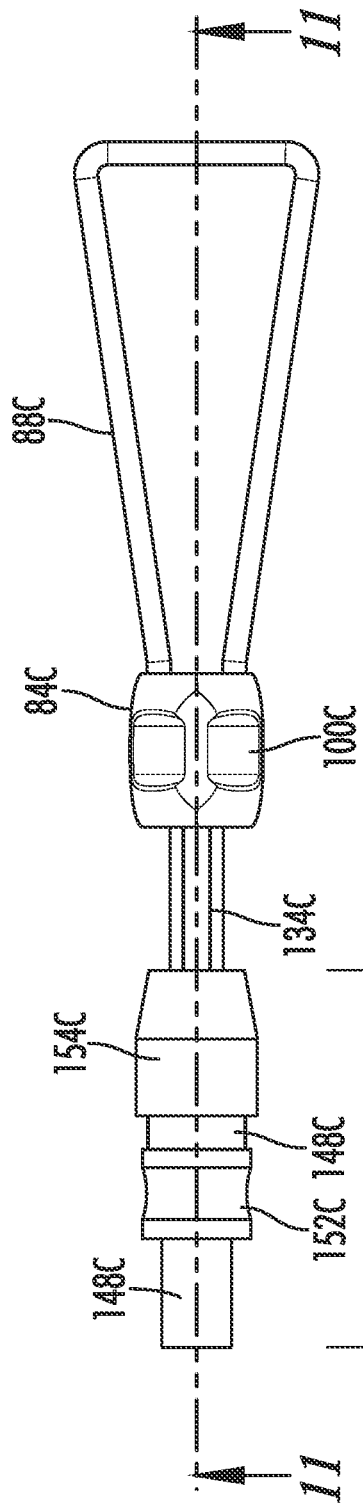
FIG. 10 illustrates a front plan view of the right locking port and right farming tool of FIG. 5.
Figure 11:
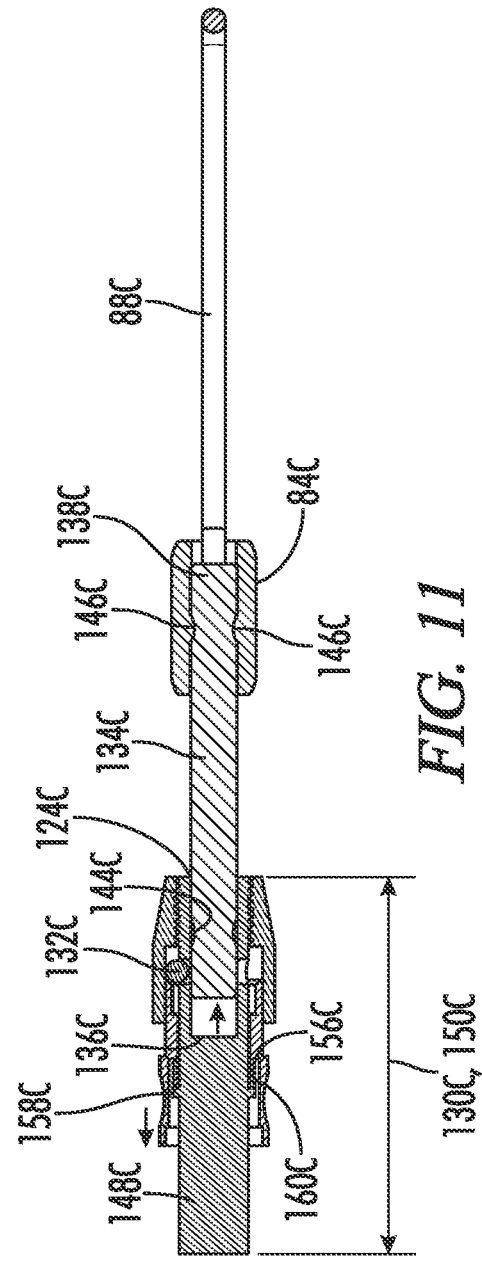
FIG. 11 illustrates a sectional view of the right locking port and right farming tool of FIG. 10, taken along line 11-11 of FIG. 10.
Figure 12:
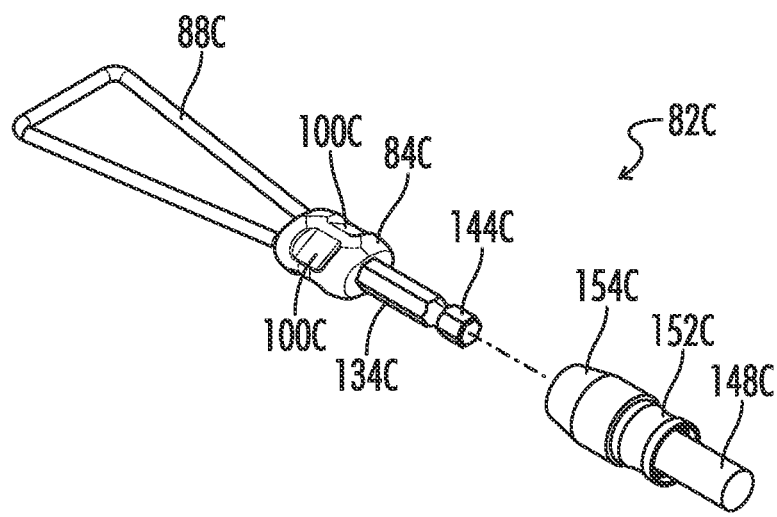
FIG. 12 illustrates a front perspective view of the right locking port and right farming tool of FIG. 5, with the right farming tool locking bit removed from the right locking port socket.
Figure 13:
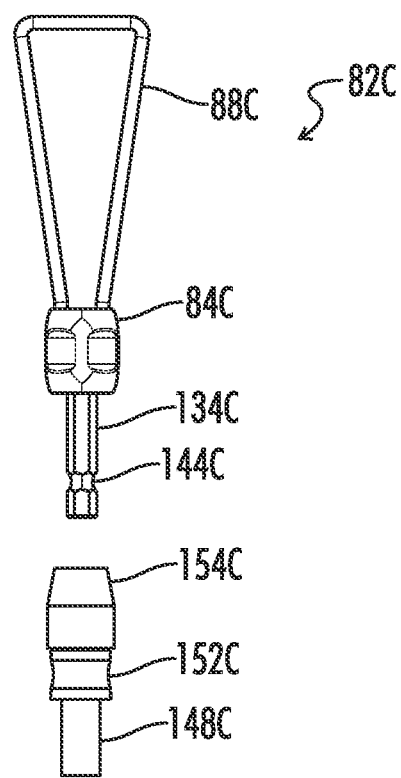
FIG. 13 illustrates a front plan view of the right locking port and right farming tool of FIG. 5, with the right farming tool locking bit removed from the right locking port socket.
Figure 14A:
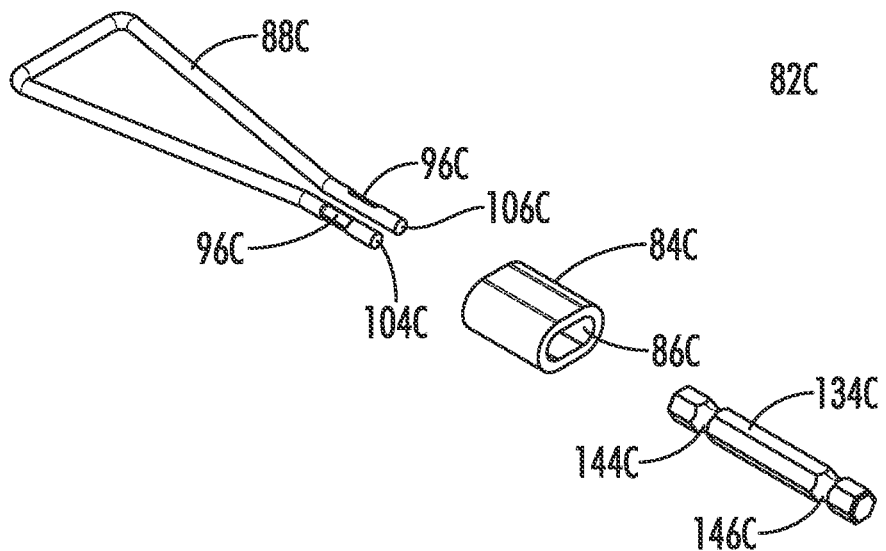
FIG. 14A illustrates a front perspective exploded view of the right farming tool of FIG. 5.
Figure 14B:
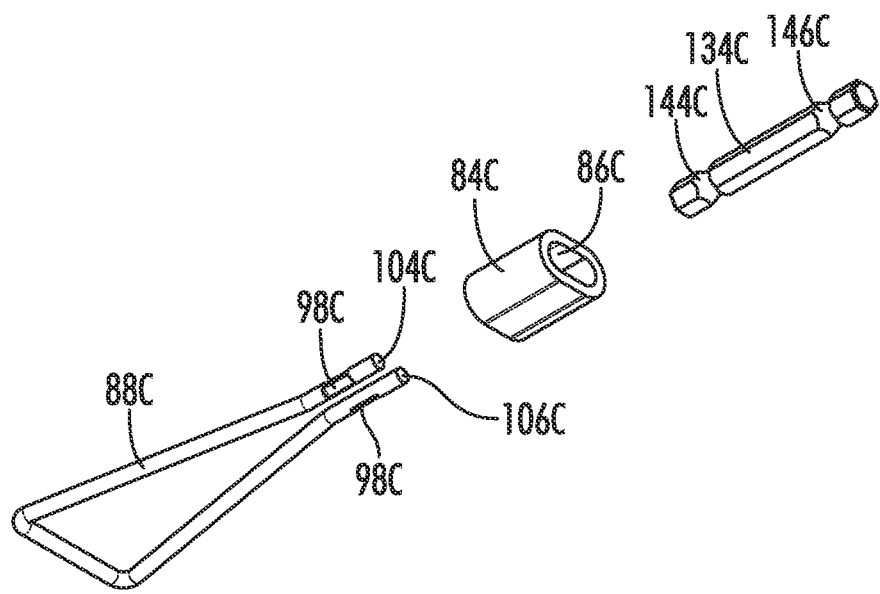
FIG. 14B illustrates a front perspective exploded view of the right farming tool of FIG. 5.
Figure 15A:
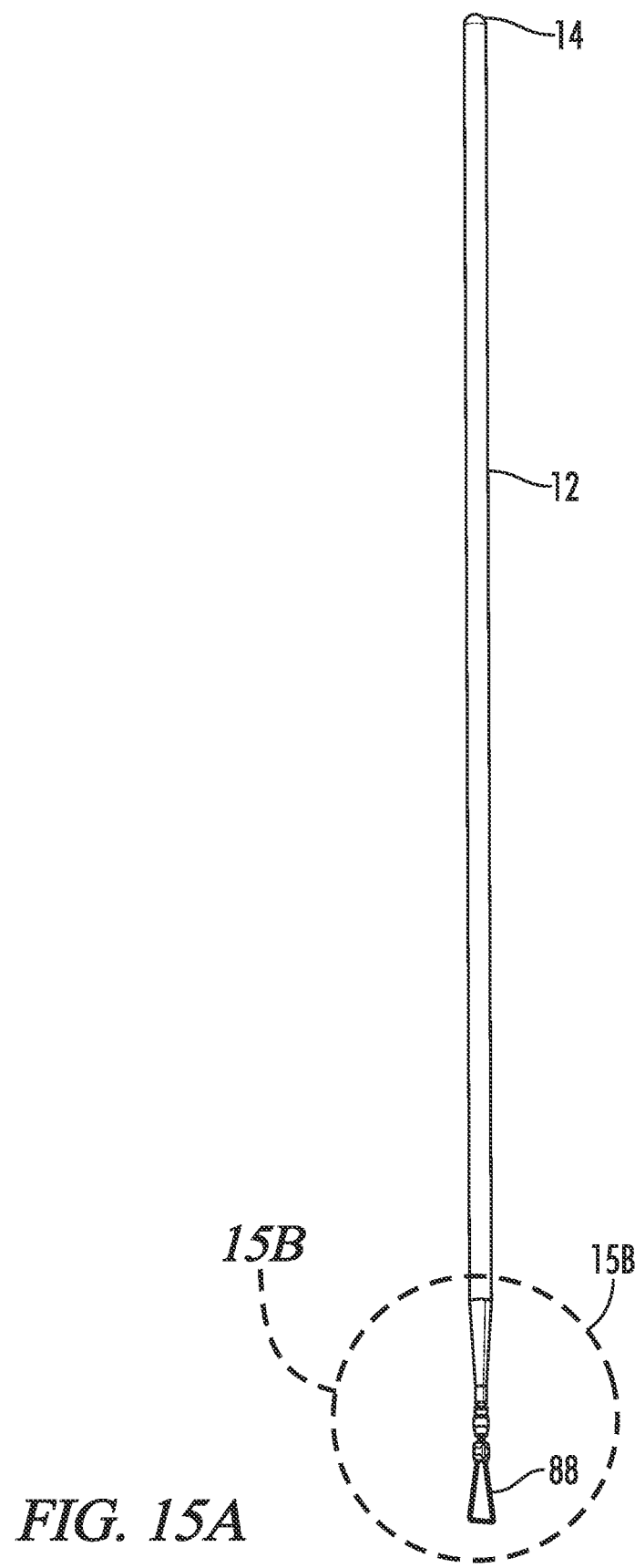
FIG. 15A illustrates a front perspective view of a farming tool system of another embodiment of the present invention.
Figure 15B:
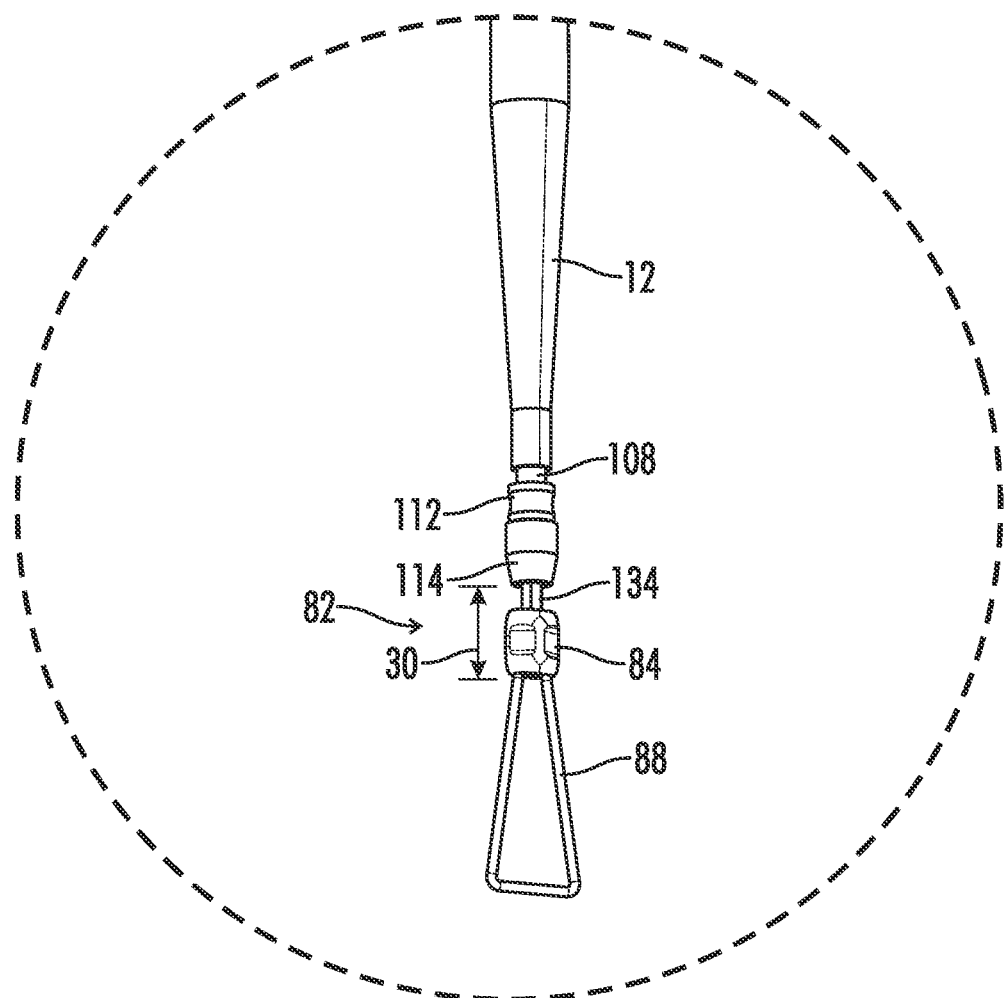
FIG. 15B illustrates a closeup view of the circled area labeled 15B in FIG. 15A.

Referring further to the handle locking port 22, the handle locking port 22 of FIGS. 1-23 may include a handle locking port open forward end 24 leading to a handle locking port socket (not visible in FIGS. 1-23 but preferably equivalent in structure and design to head locking port socket 126C in FIG. 9, as described later herein), a handle locking port rear end 28, a handle locking port length 30 extending from the handle locking port open forward end 24 to the handle locking port rear end 28 and generally parallel to the shaft length 18, and a handle locking port protrusion (not visible in FIGS. 1-23 but preferably equivalent in structure and design to head locking port protrusion 132C in FIGS. 9 and 11, as described later herein) located between the handle locking port open forward end 24 and the handle locking port rear end 28 and configured to project into the handle locking port socket 26. The handle locking port socket and the handle locking port protrusion are not visible in FIG. 2 because they are inside the handle rod flange 114. However, as mentioned above, the head locking port socket 126C, which preferably utilizes the same design as the handle locking port is shown in FIG. 9 and described later herein. Similarly, the head locking port protrusion 132C, which preferably utilizes the same design as the handle locking port protrusion, is shown in FIGS. 9 and 11 and described later herein. In some embodiments, the shaft length 18 may be, for example, at least about 24 inches, e.g., about 48 inches to about 72 inches. The shaft width 20 may be, for example, between about 1 to about 2 inches. Preferably, the shaft length 18 is between about 20 times and about 80 times the shaft width 20. In other words, the shaft width 20 is preferably small enough to be held in a user's hand. In an exemplary embodiment, the handle shaft 12 is comprised of wood. However, the handle shaft 12 may be comprised of any suitable material.

Figure 3:
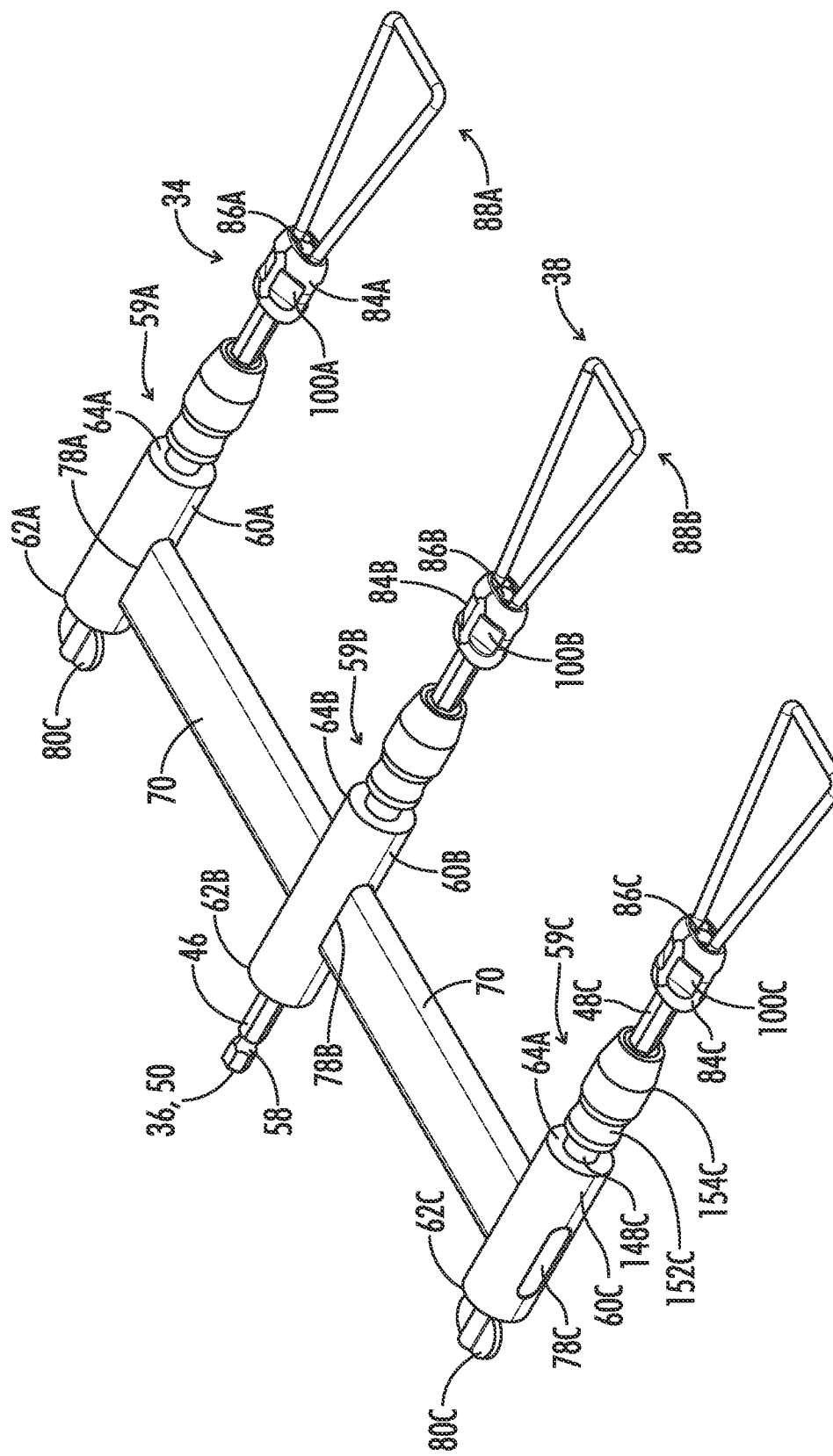
FIG. 3 illustrates a side perspective view of the multi-head attachment of the farming tool system of FIG. 1.
Figure 4:
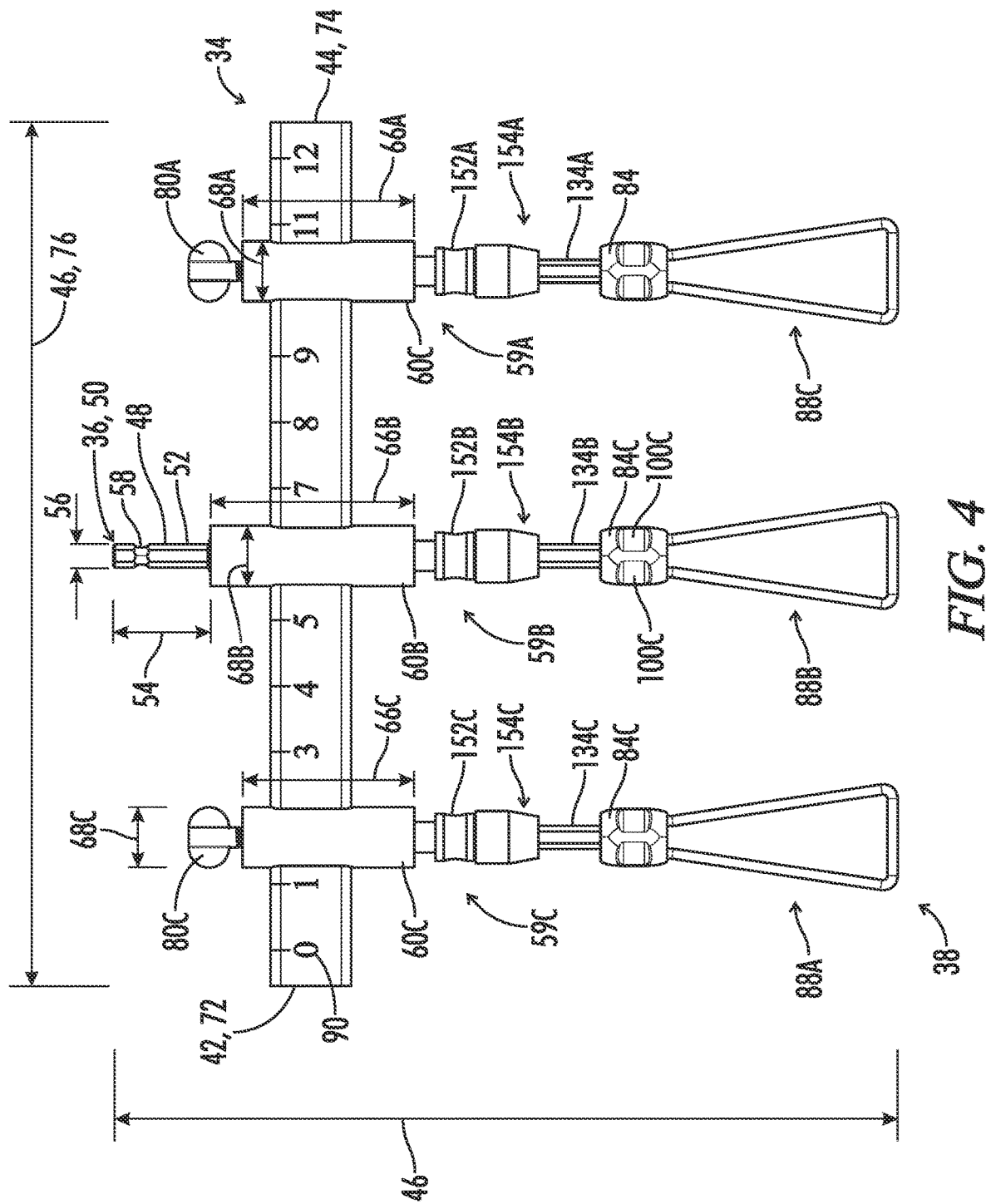
FIG. 4 illustrates a front elevation view of the multi-head attachment of the farming tool system of FIG. 1.
Figure 5:
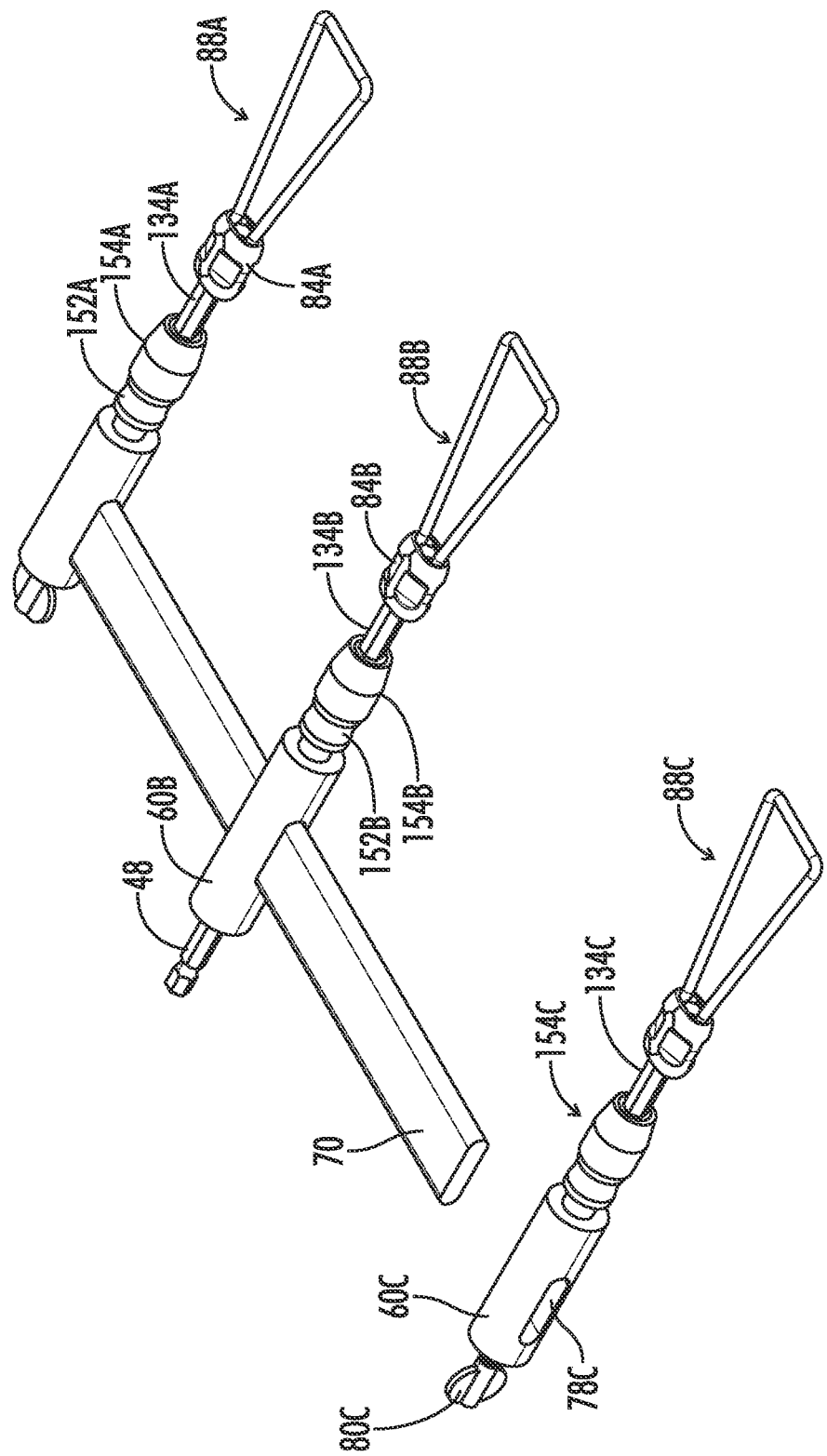
FIG. 5 illustrates a side perspective view of the multi-head attachment of the farming tool system of FIG. 1 with the right base removed from the rail.
Figure 8:
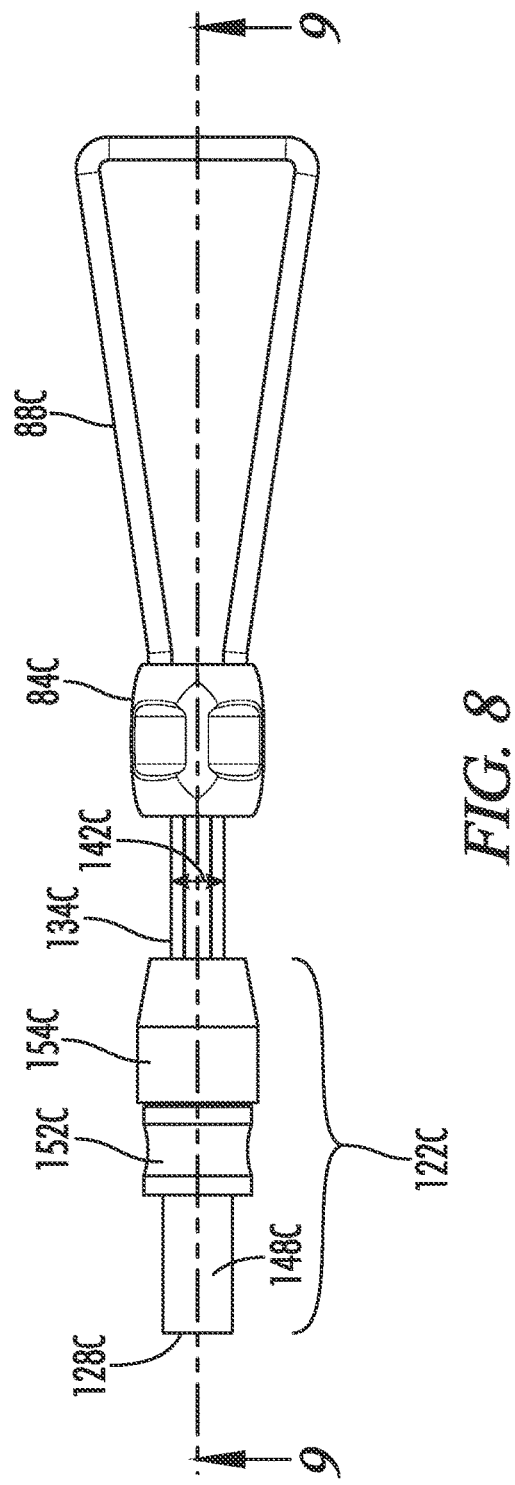
FIG. 8 illustrates a front plan view of the right locking port and right farming tool of FIG. 5.

As mentioned, the handle locking port 22 may detachably connect to a multi-head attachment 34. As shown in FIGS. 1-14 and 19-23, the multi-head attachment 34 may include a multi-head attachment rear end 36, a multi-head attachment forward end 38, a multi-head attachment length 40 extending from the multi-head attachment rear end 36 to the multi-head attachment forward end 38 and generally parallel to the shaft length 18, a multi-head attachment left end 42, a multi-head attachment right end 44, and a multi-head attachment width 46 extending from the multi-head attachment left end 42 to the multi-head attachment right end 44 and generally perpendicular to the multi-head attachment length 40. The multi-head attachment 34 may further include a multi-head locking bit 48 comprising a multi-head locking bit rear end 50 located adjacent to (i.e., at or near) the multi-head attachment rear end 36, a multi-head locking bit forward end 52, a multi-head locking bit length 54 extending from the multi-head locking bit rear end 50 to the multi-head locking bit forward end 52, a multi-head locking bit width 56 generally perpendicular to the multi-head locking bit length 54, a multi-head locking bit rear notch/indentation 56 located between the multi-head locking bit forward end 52 and the multi-head locking bit rear end 50. Due to the multi-head locking bit rear notch 56, the multi-head locking bit width 56 may be variable along the multi-head locking bit length 54. The multi-head locking bit rear notch 56 may extend around the perimeter of the multi-head locking bit 48, as shown in FIGS. 3-5 for example. The multi-head locking bit 48 may be configured to removably seat inside the handle locking port socket, and the handle locking port protrusion may be configured to releasably engage the multi-head locking bit rear notch 56.

The multi-head attachment 34 may further include a main head 59B comprising a main base 60B comprising a main base rear end 62B connected to the multi-head locking bit forward end 52, a main base forward end 64B, a main base length 66B extending from the main base rear end 62B to the main base forward end 64B and generally parallel to the multi-head attachment length 40, and a main base width 68B generally perpendicular to the main base length 66B. The word "main" is used herein for ease of reference to refer to the base 66B connected to the multi-head locking bit forward end 52 (and the components connected to the main base 66B) and is not meant to refer to the importance or size of any component. It will be appreciated that the "main" base 60B and components are typically between the left and right base 60A and 60C components, as illustrated in FIGS. 1-14 and 19-23.

The multi-head attachment 34 may further include a rail 70 connected to the main base 60B and comprising a rail left end 72, a rail right end 74, and a rail width 76 extending from the rail left end 72 to the rail right end 74 and generally parallel to the main base width 68B. In the illustrated embodiment, the rail 70 extends through a slot 78B in the main base 60B and the main base 60B is not slideable along the rail width 76. In other words, the main base 60B is fixed.

The multi-head attachment 34 may further include at least one lateral head 59A and 59C comprising a lateral base 60A, 60C located laterally to the main base 60B and slideable along at least a portion of the rail width 76. For example, in the illustrations, the multi-head attachment 34 includes a left head 59A comprising a left base 60A located to the left of the main base 60B and right head 59C comprising a right base 60C located to the right of the main base 60B. Thus, the at least one lateral head in the illustrations refers to the right head 59C and left head and 59A. In the illustrations, the "left" base 60A is to the left of the main base 60B when viewed by a user holding the handle shaft 12 and the "right" base 60C is to the right of the main base 60B when viewed by a user holding the handle shaft 12. However, the words "left" and "right" used herein are not meant to be construed as requiring the user to view the components from a certain viewpoint. For ease of reference, the letter "A" is used in conjunction with the left head 59A and components associated with the left head 59A, the letter "B" is used in conjunction with the main head 59B and components associated with the main head 59B, and the letter "C" is used in conjunction with the right head 59C and components associated with the right head 59C. For some components, the components of the right head 59C are specifically labelled and shown in FIGS. 6-14 for exemplary purposes and it will be understood that the components of the left head 59A and main head 59B may be similar in design.

The left and right bases 60A and 60C (i.e., the lateral bases), respectively, may each include a base rear end 62A, 62C, a base forward end 64A, 64C, a base length 66A, 66C extending from the base forward end 64A, 64C to the base rear end 62A, 62C and generally parallel to the main base length 66B, a base width 68A, 68C generally perpendicular to the base length 66A, 66C, a base slot 78A, 78C extending through the base width 68A, 68C and receiving a portion of the rail 70, and a base lock 80A, 80C. The base locks 80A, 80C may have a locked position in which the left and right base 60A, 60C are not slideable along at least a portion of the rail width 76 and an unlocked position in which the left and right base 60A, 60C are not slideable along at least a portion of the rail width 76. Preferably, the left and right bases 60A, 60C are fully removable from the rail 70. See FIG. 5, where the right base 60A is fully removable from the rail 70.

Preferably, the handle locking port 22 has an unlocked position in which the multi-head locking bit 48 is removable forwardly out of the handle locking port socket and a locked position in which the handle locking port protrusion moves laterally towards the multi-head locking bit rear notch 58 and prevents the multi-head locking bit 48 from being moved out of the handle locking port socket. Preferably, in the unlocked position a user is able to insert the multi-head locking bit 48 into the handle locking port socket, but in the locked position the handle locking port protrusion prevents the user from inserting the multi-head locking bit 48 into the handle locking port socket.

Figure 16:
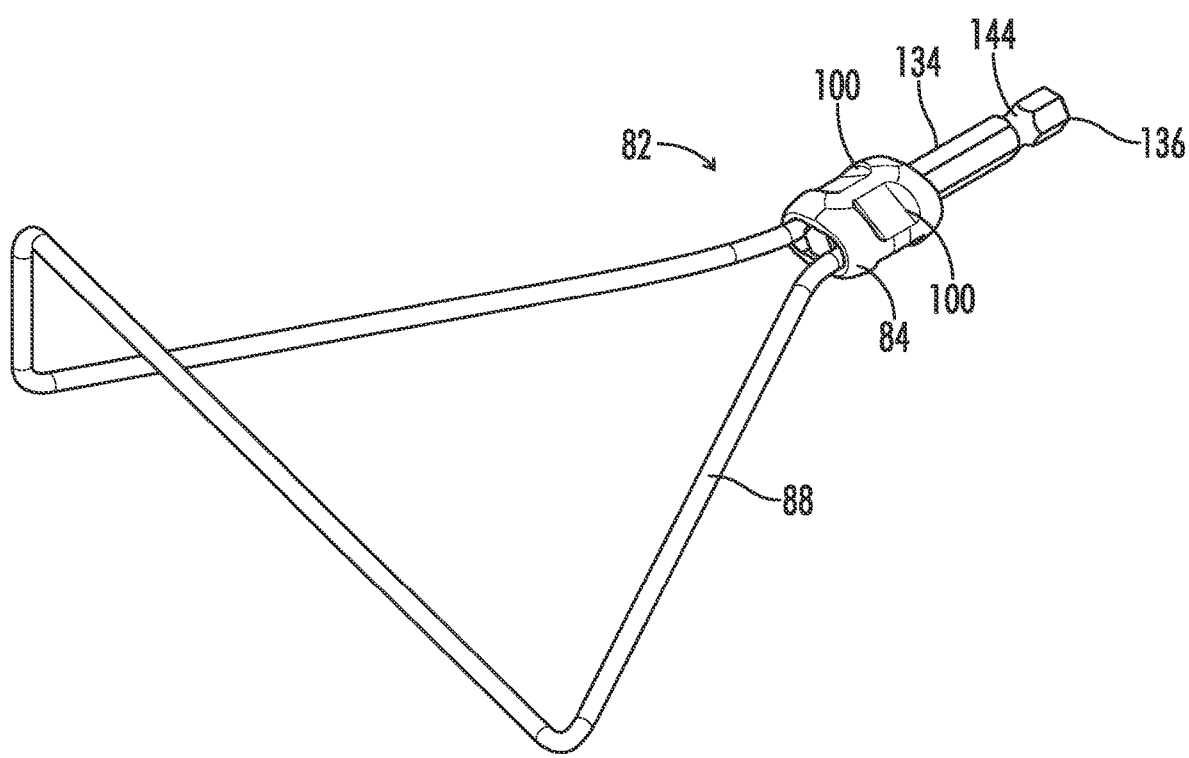
FIG. 16 illustrates a side perspective view of another farming tool for use with the farming tool systems of the present invention.
Figures 17A, 17B:
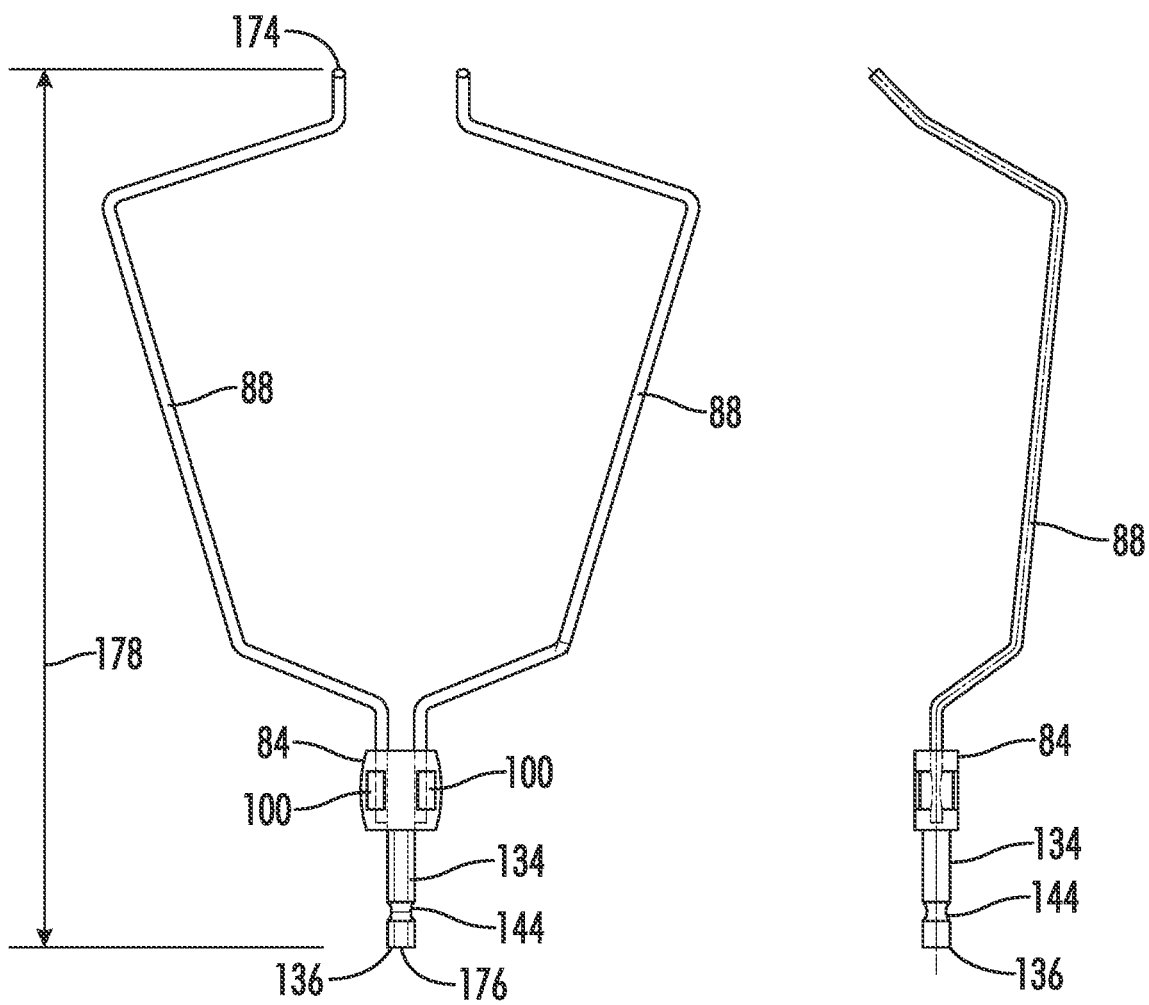
FIG. 17A illustrates a front elevation view of another farming tool for use with the farming tool systems of the present invention.
FIG. 17B illustrates a side elevation view of the farming tool of FIG. 17A.
Figure 18:
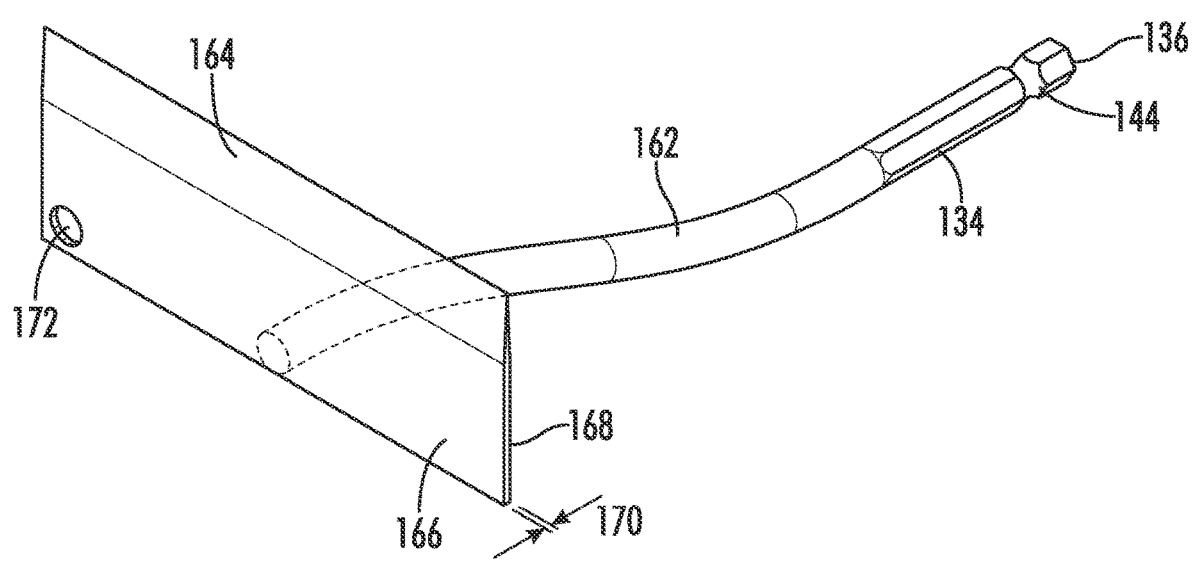
FIG. 18 illustrates a side elevation view of another farming tool for use with the farming tool systems of the present invention.
Figure 19:
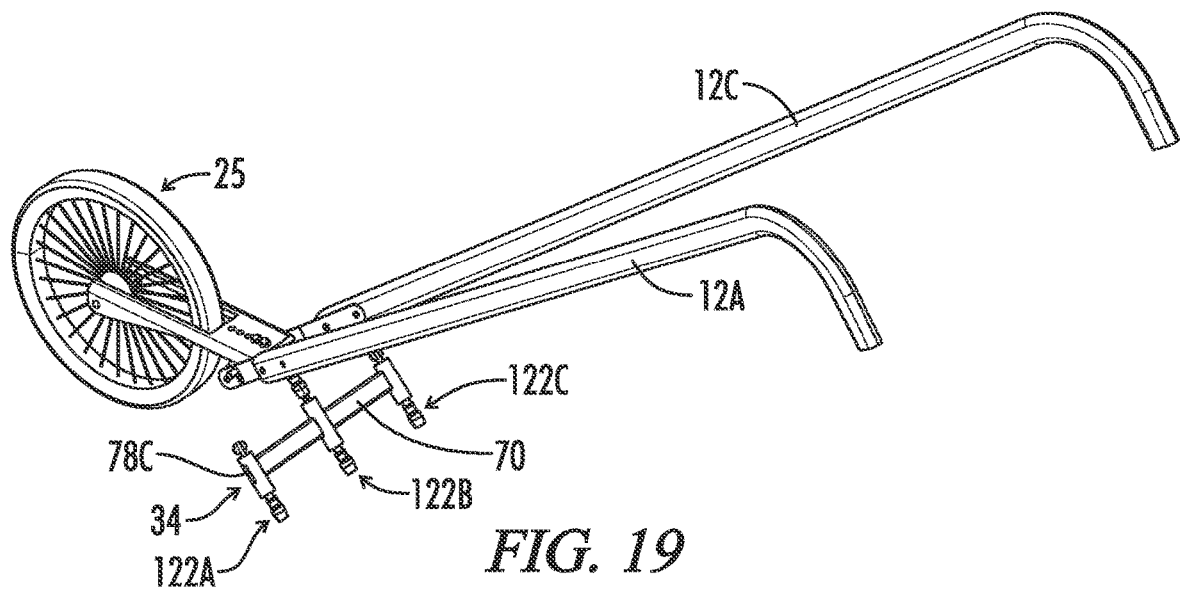
FIG. 19 illustrates a side perspective view of a wheel hoe using the multi-head attachment of FIG. 1.
Figure 20:
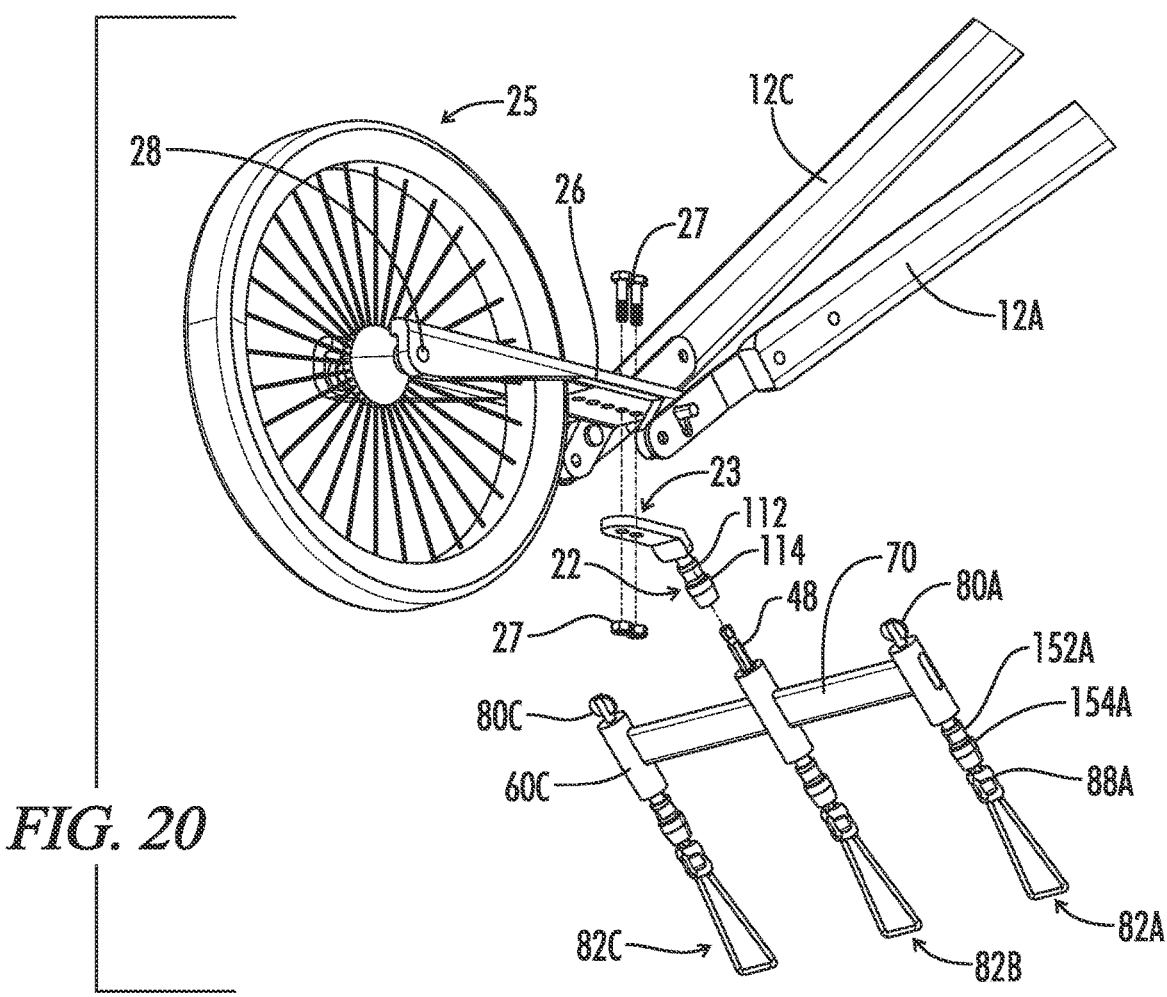
FIG. 20 illustrates an exploded side perspective view of the wheel hoe of FIG. 19.
Figure 21:
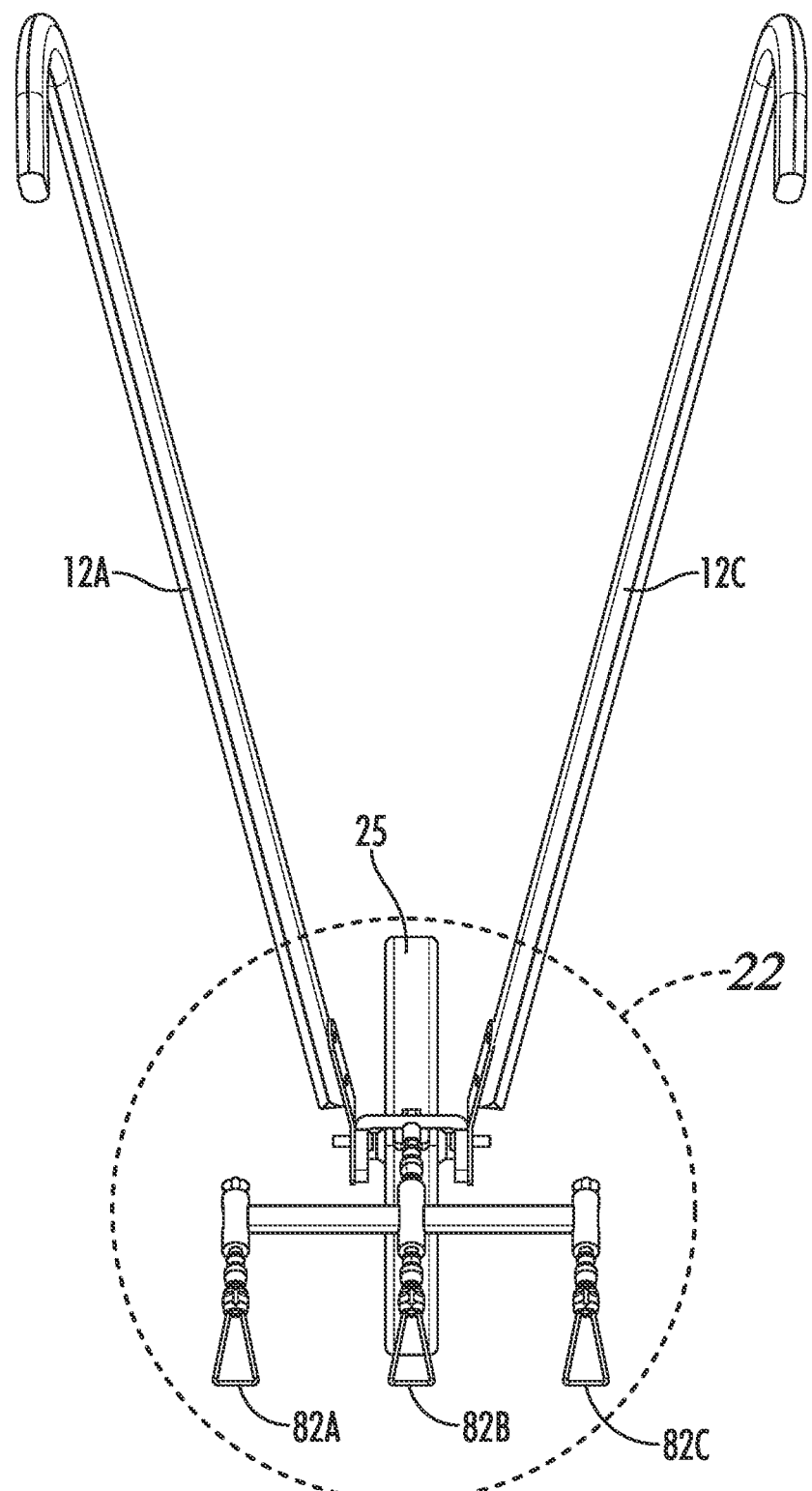
FIG. 21 illustrates a rear elevation view of the wheel hoe of FIG. 19.
Figure 22:
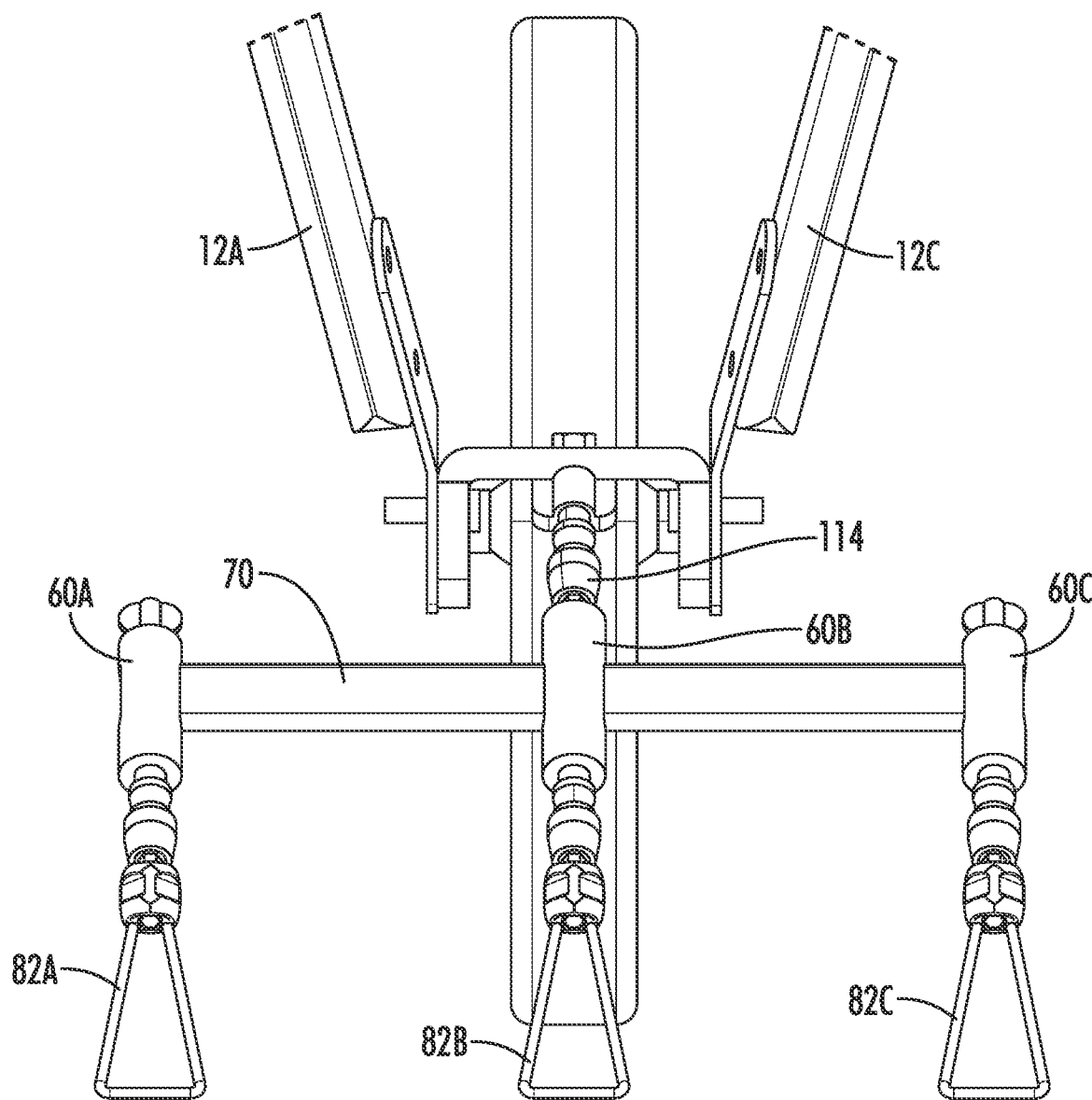
FIG. 22 illustrates a closeup view of the circled area labelled 22 in FIG. 21.
Figure 23:
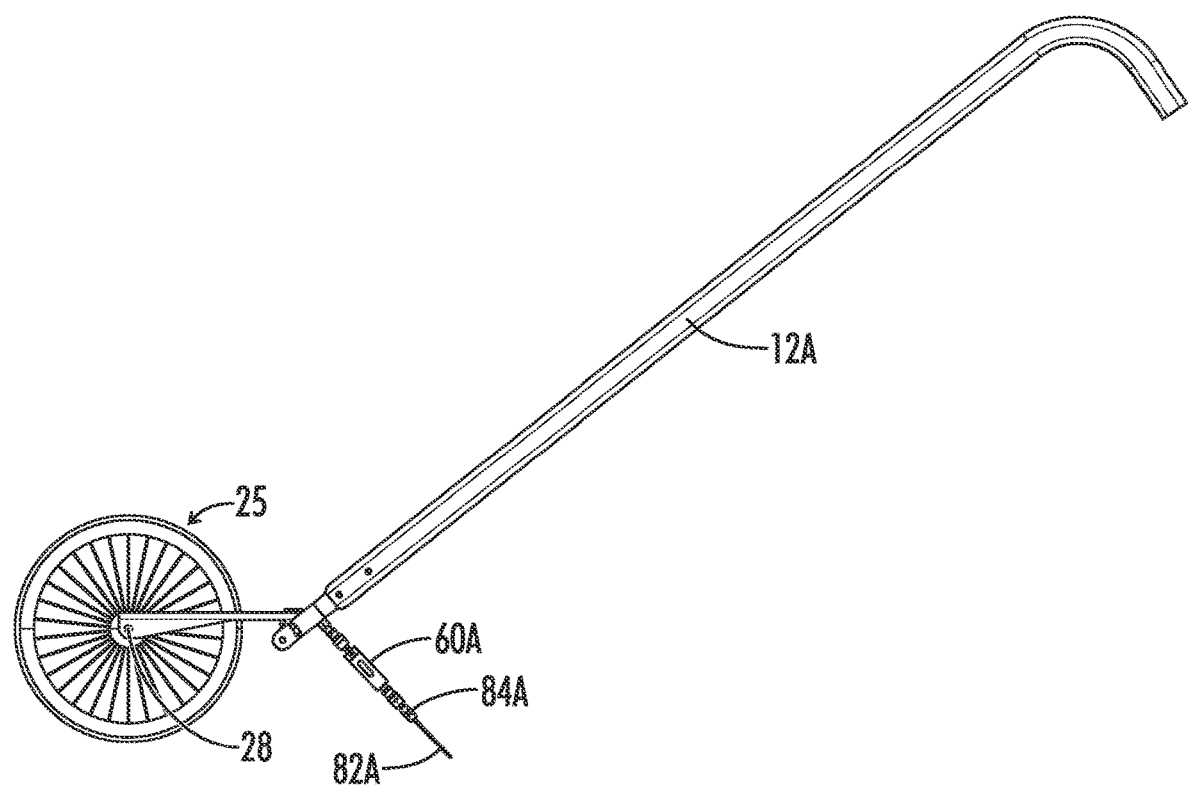
FIG. 23 illustrates a side elevation view of the wheel hoe of FIG. 19.

The multi-head attachment 34 preferably includes multiple farming tools 82A, 82B, and 82C, which may or may not be detachably connected to the multi-head attachment 34. For example, at least one of the left, right and main head 59A, 59B, and 59C may be detachably connected to a farming tool 82A, 82B, and 82C that has a rear section comprising a rod (which may be in the form of a tool locking bit 134A, 134B, 134C) detachably connected to the left, right or main head 59A, 59B, and 59C and a forward section located forwardly relative to the rear section comprising a metallic projection 88A, 88B, and 88C configured to move dirt or vegetation. Exemplary farming tools 82, 82A, 82B, and 82C are shown in FIGS. 1-15, which depict a triangular wire hoe; FIG. 16, which depicts a wire hoe with a 1 inch offset, FIGS. 17A and 17B, which depict a torsion hoe that also utilizes a wire, and FIG. 18, which depicts a colinear hoe.

Optionally, the farming tool 82A, 82B, 82C further comprises a tool collar 84A, 84B, and 84C connecting the rod (which may be in the form of a tool locking bit 134A, 134B, 134C) to the projection 88A, 88B, and 88C, the projection 88A, 88B, and 88C is in the form of a wire, the tool collar 84A, 84B, and 84C comprises a tool collar interior 86A, 86B, and 86C comprising at least one segment of the rod 134A, 134B, 134C and at least one segment of the wire 88A, 88B, and 88C, and at least one segment of the rod 134A, 134B, 134C extends rearwardly from the tool collar 84A, 84B, and 84C and at least one segment of the wire 88A, 88B, and 88C extends forwardly from the tool collar 84A, 84B, and 84C, as best seen in FIGS. 3-14. Optionally, the tool collar 84A, 84B, and 84C is in the form of a crimp, (as best seen in FIGS. 14A and 14B) the at least one segment of the wire 88A, 88B, and 88C located in the tool collar interior 86A, 86B, and 86C comprises a flat front 96A, 96B, and 96C (only 96C is shown in the drawings because the right farming tool is featured in FIGS. 14A and 14B), a flat rear 98A, 98B, and 98C (only 98C is shown in the drawings), a thickness extending from the flat front 96A, 96B, and 96C to the flat rear 98A, 98B, and 98C (which may be generally perpendicular to the multi-head attachment width 56 and optionally the multi-head attachment length 40, the tool collar 84A, 84B, and 84C comprises an indented front portion 100A, 100B, and 100C engaging the flat front 96A, 96B, and 96C and an indented rear portion 102A, 102B, and 102C (only 102C is shown in the drawings) engaging the flat rear 98A, 98B, and 98C, and the indented front portion 100A, 100B, and 100C and the indented rear portion 102A, 102B, and 102C are configured to prevent the wire 88A, 88B, and 88C from rotating within the tool collar interior 86A, 86B, and 86C. Without being bound by any particular theory, a crimp may be used because the rod 134A, 134B, 134C and wire 88A, 88B, and 88C may be comprised of different materials.

In some embodiments, the wire 88A, 88B, and 88C is a thin wire and has a diameter of between about 0.075 inches to about 0.015 inches.

Optionally, the at least one segment of the rod 134A, 134B, 134C located in the tool collar interior 86A, 86B, and 86C comprises a forward notch 146A, 146B, and 146C (only 146C is shown) extending about a perimeter of the rod 134A, 134B, 134C and the tool collar 84A, 84B, and 84C, engages the forward notch 146A, 146B, and 146C and prevents the rod 134A, 134B, 134C rotating in the tool collar interior 86A, 86B, and 86C.

Optionally, the wire 88A, 88B, and 88C comprises a free proximal end 104A, 104B, and 104C (only 104C is shown) and a free distal end 106A, 106B, and 106C (only 106C is shown) and the at least one segment is adjacent to at least one of the free proximal end 104A, 104B, and 104C and the free distal end 106A, 106B, and 106C. Optionally, the free proximal end 104A, 104B, and 104C and the free distal end 106A, 106B, and 106C are located in the tool collar interior 86A, 86B, and 86C.

Optionally, in addition to the bases 60A, 60B, 60C, at least one of (and preferably all) the left head 59A, main head 59B and right head 59C further comprises a head locking port 122A, 122B, and 122C comprising a head locking port open forward end 124A, 124B, and 124C (only 124C is shown in the drawings because right head locking port 122C is featured in FIGS. 8-11) leading to a head locking port socket 126A, 126B, and 126C (only 126C is shown in the drawings), a head locking port rear end 128A, 128B, 128C (only 128C is shown in the drawings), connected to, and located forwardly relative to, the left, main or right base 60A, 60B, 60C, a head locking port length 130A, 130B, and 130C (only 130C is shown in the drawings) extending from the head locking port open forward end 124A, 124B, and 124C to the head locking port rear end 128A, 128B, 128C and generally parallel to the shaft length 18, and a head locking port protrusion 132A, 132B, and 132C (only 132C is shown in the drawings) located between the head locking port open forward end 124A, 124B, and 124C and the head locking port rear end 128A, 128B, 128C and configured to project into the head locking port socket 126A, 126B, and 126C. Optionally, as previously mentioned, the rod of the farming tool 82A, 82B, and 82C is in the form of a tool locking bit 134A, 134B, 134C comprising a tool locking bit rear end 136A, 136B, 136C (only 136C is shown in the drawings), a tool locking bit forward end 138A, 138B, 138C (only 138C is shown in the drawings), a tool locking bit length 140A, 140B, and 140C (only 140C is shown in the drawings) extending from the tool locking bit rear end 136A, 136B, 136C to the tool locking bit forward end 138A, 138B, 138C, a tool locking bit width 142A, 142B, and 142C (only 142C is shown in the drawings) generally perpendicular to the tool locking bit length 140A, 140B, and 140C, a tool locking bit rear notch 144A, 144B, and 144C (only 144C is shown in the drawings) located between the tool locking bit forward end 138A, 138B, 138C and the tool locking bit rear end 136A, 136B, 136C. Optionally, the tool locking bit rear notch 144A, 144B, and 144C is configured to removably seat inside the head locking port socket 126A, 126B, and 126C, as shown in FIG. 9. Optionally, the head locking port protrusion 132A, 132B, and 132C is configured to releasably engage the tool locking bit rear notch 144A, 144B, and 144C. Optionally, the head locking port 122A, 122B, and 122C has an unlocked position in which the tool locking bit 134A, 134B, and 134C is removable forwardly out of the head locking port socket 126A, 126B, and 126C and a locked position in which the head locking port protrusion 132A, 132B, and 132C moves laterally towards the tool locking bit rear notch 144A, 144B, and 144C and prevents the tool locking bit 134A, 134B, and 134C from being moved out of the head locking port socket 126A, 126B, and 126C. Preferably, in the unlocked position a user is able to insert the tool locking bit 134A, 134B, and 134C into the head locking port socket 126A, 126B, and 126C, but in the locked position the head locking port protrusion 132A, 132B, and 132C prevents the user from inserting the tool locking bit 134A, 134B, and 134C into the head locking port socket 126A, 126B, and 126C.

Optionally, at least the rear ends 50, 136A, 136B, and 136C of the multi-head locking bit 48 and the tool locking bit 134A, 134B, and 134C are the same width and same shape, which allows the farming tools 88 and 88A-C of FIGS. 1-23 to be detachably connected to either the handle locking port 22 or the left, main and right head locking ports 122A, B, and C to create a system 10 of interchangeable parts. Optionally, the rear end 50 of the multi-head locking bit 48, the rear ends 136A, 136B, and 136C of the tool locking bits 134A, 134B, and 134C, the head locking port sockets 126A, 126B, and 126C and the handle locking port socket are hexagonal in shape. Optionally, the multi-head locking bit rear notch 58 extends about a perimeter of the multi-head locking bit 48 and the tool locking bit rear notch 144A, 144B, and 144C extends about a perimeter of the tool locking bit 134A, 134B, and 134C. Optionally, as best seen in FIGS. 8-11, the head locking port 122A, 122B, and 122C comprises a head rod 148A, 148B, and 148C (only 148C is shown) having a head rod length 150A, 150B, and 150C (only 150C is shown) generally parallel to the shaft length 18, a head rod collar 152A, 152B, and 152C comprising an interior receiving the head rod 148A, 148B, and 148C and a head rod flange 154A, 154B, and 154C comprising an interior comprising the head locking port socket 126A, 126B, and 126C. Optionally, moving the head rod collar 152A, 152B, and 152C rearwardly along a portion of the head rod length 150A, 150B, and 150C relative to the head rod flange 154A, 154B, and 154C is configured to move the head locking port 122A, 122B, and 122C from the locked position to the unlocked position. Optionally, the interior of the head rod collar 152A, 152B, and 152C comprises a forward ledge 156A, 156B and 156C (only 156C is shown) extending from the head rod 148A, 148B, and 148C, a rear ledge 158A, 158B and 158C (only 158C is shown) and a spring 160A, 160B, and 160C (only 160C is shown) located between the forward ledge 156A, 156B and 156C and the rear ledge 158A, 158B and 158C and further wherein moving the head rod collar 152A, 152B, and 152C rearwardly along a portion of the head rod length 150A, 150B, and 150C relative to the head rod flange 154A, 154B, and 154C is configured to compress the spring 160A, 160B, and 160C. Optionally the spring 160A, 160B, and 160C is configured to resist rearwardly movement of the head rod collar 152A, 152B, and 152C relative to the head rod flange 154A, 154B, and 154C so as to bias the head locking port 122A, 122B, and 122C in the locked position. Optionally, the head locking port protrusion 132A, 132B, and 132C is a ball.

Optionally, the handle locking port open forward end 24 and the head locking port forward ends 124A, 124B and 124C are generally hexagonal in shape. Optionally, the rail 70 is in the form of a ruler comprising indicia 90 spaced at regular intervals, as shown in FIG. 4. The rail 70 may be generally rectangular in shape. Optionally, the lock 80A and 80C of the at least one lateral base 60A and 60C is in the form of a clamp configured to releasably engage the rail 70. Optionally, the clamp comprises a rotatable knob 92A and 92C (only 92C is shown), and a bolt 94A and 94C (only 94C is shown) located forwardly relative to, and connected to the knob 92A and 92C, and further wherein the clamp is located adjacent to the rear end 62A and 62C of the at least one lateral base 60A and 60C. The bolt 94A and 94C may thread into a bolt hole 95A and 95C (only 95C is shown) to engage the rail 70. Optionally, the multi-head locking bit 48 and the main base 60B are located approximately in the center of the multi-head attachment width 46.

Optionally, the handle locking port 22 comprises a handle rod 108 having a handle rod length (not shown but preferably equivalent to 150C) generally parallel to the shaft length 18, a handle rod collar 112 comprising an interior receiving the handle rod 108 and a handle rod flange 114 comprising an interior comprising the handle locking port socket (not shown but preferably equivalent to 126C), and moving the handle rod collar 112 rearwardly along a portion of the handle rod length relative to the handle rod flange 114 is configured to move the handle locking port 22 from the locked position to the unlocked position. Optionally, the handle rod collar interior comprises a forward ledge extending from the handle rod 118, a rear ledge and a spring located between the forward ledge and the rear ledge and further wherein moving the handle rod collar 112 rearwardly along a portion of the handle rod length relative to the handle rod flange 114 is configured to compress the spring. (It will be appreciated that though the forward ledge, the rear ledge and the spring associated with the handle locking port are not visible but are preferably similar in design to the head forward ledge 156C, head rear ledge 158C and the head spring 160C, which are associated with the head locking port 122C, as best seen in the sectional views of FIGS. 9 and 11. Optionally the spring of the handle locking port 22 is configured to resist rearwardly movement of the handle rod collar 112 relative to the handle rod flange 114 and to bias the handle locking port 22 in the locked position. Optionally, the handle locking port protrusion, like the head locking port protrusion 132C, is a ball.

FIGS. 19-23 illustrate a wheel hoe that uses the multi-head attachment 34. The wheel hoe in FIGS. 19-23 includes a left handle shaft 12A and right handle shaft 12C. A wheel 25 is connected to the left handle shaft 12A and right handle shaft 12B via wheel plate 26, which is located between the left handle shaft 12A and right handle shaft 12C. Wheel 25 spins on axle 28. Wheel plate 26 in turn is attached to handle locking port plate 23 with fasteners 27. Handle locking port plate 23 in turn is attached to handle locking port 22, so that handle locking port 22 is connected to the left handle shaft 12A and right handle shaft 12C. The multi-head attachment 34 detachably connects to handle locking port 22 via multi-head locking bit 48 as previously described.

As described previously, and shown in FIGS. 15-18, in lieu of a multi-head attachment 34, the farming tools 82, 82A, 82B, 82C may be inserted into the handle locking port socket. It will be appreciated that the letters "A", "B" and "C" are not included in the numerals of FIGS. 15-18 since FIGS. 15-18 show only one farming tool 82.

Optionally, the farming tool 82 includes a farming tool rear end 174, a farming tool forward end 176, a farming tool length 178 extending from the farming tool forward end 176 to the farming tool rear end 178. Optionally, the farming tool systems 10 of the present disclosure are used in a method that includes: a) providing the farming tool system 10; b) using the farming tool 82, 82A, 82B, and 82C to move dirt or vegetation.

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

Part List

| Part | Number |
|---|---|
| System | 10 |
| Handle shaft | 12, 12A, 12C |
| shaft rear end | 14 |
| shaft forward end | 16 |
| shaft length | 18 |
| shaft width | 20 |
| handle locking port | 22 |
| handle locking port plate | 23 |
| handle locking port open forward end | 24 |
| wheel | 25 |
| wheel plate | 26 |
| Wheel plate fasteners | 27 |
| Wheel axle | 28 |
| handle locking port socket | Not shown but equivalent to 126C |
| handle locking port rear end | 28 |
| handle locking port length | 30 |
| handle locking port protrusion | not shown but equivalent to 132C |
| multi-head attachment | 34 |
| multi-head attachment rear end | 36 |
| multi-head attachment forward end | 38 |
| multi-head attachment length | 40 |
| multi-head attachment left end | 42 |
| multi-head attachment right end | 44 |
| multi-head attachment width | 46 |
| multi-head locking bit | 48 |
| multi-head locking bit rear end | 50 |
| multi-head locking bit forward end | 52 |
| multi-head locking bit length | 54 |
| multi-head locking bit width | 56 |
| multi-head locking bit rear notch | 58 |
| (Left, main and right) head | 59A, B, C |
| (Left, main and right) base | 60A, B, C |
| (left, main and right) base rear end | 62A, B, C |
| (left, main and right) base forward end | 64A, B, C |
| (left, main and right) base length | 66A, B, C |
| (left, main and right) base width | 68A, B, C |
| rail | 70 |
| rail left end | 72 |
| rail right end | 74 |
| rail width | 76 |
| (left, main and right) base slot | 78A, B, C |
| (left and right) base lock/clamp | 80A, C |
| (left, main and right) farming tool | 82A, B, C |
| (left, main and right) tool collar | 84A, B, C |
| (left, main and right) tool collar interior | 86A, B, C |
| (left, main and right) tool projection/wire | 88A, B, C |
| rail indicia | 90 |
| (left and right) rotatable knob | 92A, C |
| (left and right) bolt | 94A, C |
| (left and right) bolt hole | 95A, C |
| (left, main, and right) flat front | 96A, B, C |
| (left, main and right) flat rear | 98A, B, C |
| (left, main and right) indented front portion(s) | 100A, B, C |
| (left, main and right) indented rear portion | 102A, B, C |
| (left, main and right) wire free proximal end | 104A, B, C |
| (left, main and right) wire free distal end | 106A, B, C |
| handle rod | 108 |
| handle rod length | not shown but equivalent to 150C |
| handle rod collar | 112 |
| handle rod flange | 114 |
| forward ledge | not shown but equivalent to 156C |
| rear ledge | not shown but equivalent to 158C |
| spring | not shown but equivalent to 160 |
| (left, main, and right) head locking port | 122A, B, C |
| (left, main, and right) head locking port open forward end | 124A, B, C |
| (left, main and right) head locking port socket | 126A, B, C |
| (left, main and right) head locking port rear end | 128A, B, C |
| (left, main and right) head locking port length | 130A, B, C |
| (left, main and right) head locking port protrusion | 132A, B, C |
| (left, main and right) tool locking bit | 134A, B, C |
| (left, main and right) tool locking bit rear end | 136A, B, C |
| (left, main and right) tool locking bit forward end | 138A, B, C |
| (left, main and right) tool locking bit length | 140A, B, C |
| (left, main, and right) tool locking bit width | 142A, B, C |
| (left, main and right) tool locking bit rear notch | 144A, B, C |
| (left, main and right) tool locking bit forward notch | 146A, B, C |
| Head rod | 148A, B, C |
| Head rod length | 150A, B, C |
| Head rod collar | 152A, B, C |
| Head rod flange | 154A, B, C |
| Head forward ledge | 156A, B, C |
| Head rear ledge | 158A, B, C |
| Head spring | 160A, B, C |
| Curved rear shaft | 162 |
| Plate | 164 |
| plate front end | 166 |
| plate rear end | 168 |
| plate thickness | 170 |
| plate aperture | 172 |

The invention claimed is:

1. A farming tool system comprising:
   a) a handle shaft having a rear end, a forward end, a shaft length extending from the rear end to the forward end, and a shaft width generally perpendicular to the shaft length;
   b) a handle socket located adjacent to the shaft forward end; and
   c) a farming tool comprising a farming tool rear end, a farming tool forward end, a farming tool length extending from the farming tool forward end to the farming tool rear end, a rod comprising a rod rear end at the farming tool rear end, a rod forward end, a tool collar in the form of a crimp and comprising a tool collar interior, and at least one wire extending forwardly from the tool collar interior to the farming tool forward end,
   wherein the rod rear end is releasably inserted into the handle socket,
   wherein the rod is partially located in the tool collar interior,
   wherein the rod extends rearwardly from the tool collar interior to the farming tool rear end parallel to the shaft length, and
   wherein the tool collar further comprises an indented top portion, and an indented bottom portion,
   wherein the at least one wire comprises two rear wire segments,
   wherein the rod comprises a forward segment located in the tool collar interior between the two rear wire segments,
   wherein the two rear wire segments each comprise a flat top portion and a flat bottom portion,
   wherein the tool collar indented top portion engages the flat top portion of each of the two rear wire segments and the tool collar indented bottom portion engages the flat bottom portion of each of the two rear wire segments and further wherein the two rear wire segments are not rotatable within the tool collar interior.

2. The farming tool system of claim 1 wherein the rod rear end is removable from the handle socket by moving the rod rear end forwardly out of the handle socket.

3. The farming tool system of claim 1 wherein the at least one wire and the rod are comprised of different materials.

4. The farming tool system of claim 1 wherein the indented top portion comprises two top indentations and further wherein the indented bottom portion comprises two bottom indentations.

5. The farming tool system of claim 1 wherein the two rear wire segments each comprise a free rear end.

6. The farming tool system of claim 1 wherein the handle socket comprises an open forward end.

\* \* \* \* \*